United States Patent
McKegney et al.

(10) Patent No.: US 10,013,157 B2
(45) Date of Patent: Jul. 3, 2018

(54) COMPOSING WEB-BASED INTERACTIVE 3D SCENES USING HIGH ORDER VISUAL EDITOR COMMANDS

(71) Applicant: Box, Inc., Los Altos, CA (US)

(72) Inventors: Ross Albert Inch McKegney, San Francisco, CA (US); Michael David Charles Bond, Mountain View, CA (US); Derrick Ronald Weis, Mountain View, CA (US)

(73) Assignee: Box, Inc., Redwood City, CA (US)

( * ) Notice: Subject to any disclaimer, the term of this patent is extended or adjusted under 35 U.S.C. 154(b) by 348 days.

(21) Appl. No.: 14/806,561

(22) Filed: Jul. 22, 2015

(65) Prior Publication Data

US 2017/0024112 A1     Jan. 26, 2017

(51) Int. Cl.
  *G06F 3/0484*  (2013.01)
  *G06F 3/0481*  (2013.01)

(52) U.S. Cl.
  CPC ...... *G06F 3/04847* (2013.01); *G06F 3/04815* (2013.01); *G06F 3/04845* (2013.01)

(58) Field of Classification Search
  CPC .............. G06F 3/04847; G06F 3/04815; G06F 3/04845; G06T 13/20; G06T 15/00; G06T 17/00; G06T 19/00; A63F 2300/6009
  See application file for complete search history.

(56) References Cited

U.S. PATENT DOCUMENTS

| | | | | |
|---|---|---|---|---|
| 7,814,436 | B2 * | 10/2010 | Schrag | G06F 3/04815 715/836 |
| 8,817,021 | B1 * | 8/2014 | Hickman | G06T 15/00 345/420 |
| 8,817,067 | B1 * | 8/2014 | Fan | H04N 5/23238 348/36 |
| 9,183,672 | B1 * | 11/2015 | Hickman | G06T 17/00 |
| 9,280,821 | B1 * | 3/2016 | Choe | G01C 11/06 |
| 9,403,087 | B2 * | 8/2016 | Riley | A63F 13/12 |

(Continued)

OTHER PUBLICATIONS

"WebGL: Interacting with browser scripting", URL: http://docs.unity3d.com/Manual/webgl-interactingwithbrowserscripting.html, May 2017.

(Continued)

*Primary Examiner* — Tadesse Hailu
(74) *Attorney, Agent, or Firm* — Vista IP Law Group, LLP

(57) ABSTRACT

A cloud-based environment is configured to interface with storage devices that store 3D object models and a 3D rendering code base that is accessible by two or more user devices over a network using browsers or web agents. A web application is delivered to the user device, whereupon the browser or agent receives the 3D object model and the 3D rendering code into a web application that has user controls for defining at least one 3D scene that is rendered using user-defined camera shots and events associated with the 3D object model. User interactions invoke executable event handler components and executable shot components that correspond to one or more camera shots. User controls serve to invoke generation of custom event handler components and executable shot components. A preview of the 3D scene is presented by rendering the shots and events in a web browser or web agent.

20 Claims, 16 Drawing Sheets

(56) References Cited

U.S. PATENT DOCUMENTS

| | | | | |
|---|---|---|---|---|
| 2003/0090530 A1* | 5/2003 | Ramani | G06F 17/50 | 715/848 |
| 2004/0034295 A1* | 2/2004 | Salganicoff | A61B 5/14532 | 600/365 |
| 2004/0239679 A1* | 12/2004 | Ito | G06T 15/00 | 345/555 |
| 2008/0174598 A1* | 7/2008 | Risenhoover | G06F 17/5004 | 345/419 |
| 2008/0246757 A1* | 10/2008 | Ito | G06T 15/10 | 345/419 |
| 2010/0013842 A1* | 1/2010 | Green | G06T 15/005 | 345/522 |
| 2010/0045662 A1* | 2/2010 | Boothroyd | G06F 17/30893 | 345/419 |
| 2010/0097375 A1* | 4/2010 | Tadaishi | G06T 17/00 | 345/420 |
| 2010/0218825 A1* | 9/2010 | Jee | C09B 57/10 | 136/261 |
| 2012/0254881 A1* | 10/2012 | Hamamoto | G06F 9/4887 | 718/102 |
| 2012/0268463 A1* | 10/2012 | Loberg | G06F 17/5004 | 345/420 |
| 2013/0120367 A1* | 5/2013 | Miller | G06T 15/00 | 345/419 |
| 2013/0125029 A1* | 5/2013 | Miller | G06F 9/45529 | 715/760 |
| 2013/0132466 A1* | 5/2013 | Miller | H04L 67/02 | 709/203 |
| 2013/0222373 A1* | 8/2013 | Weinstein | G06Q 50/16 | 345/419 |
| 2013/0241926 A1* | 9/2013 | Asaria | G06Q 10/00 | 345/419 |
| 2015/0317571 A1* | 11/2015 | Maetz | G09C 5/00 | 386/278 |

OTHER PUBLICATIONS

"Interaction Components for your Verold Scenes", URL: https://www.verold.com/blog/posts/interaction-components-for-your-verold-scenes-83, Oct. 2014.

"Browser-Based Integrated Environment", Jun. 2015.

\* cited by examiner

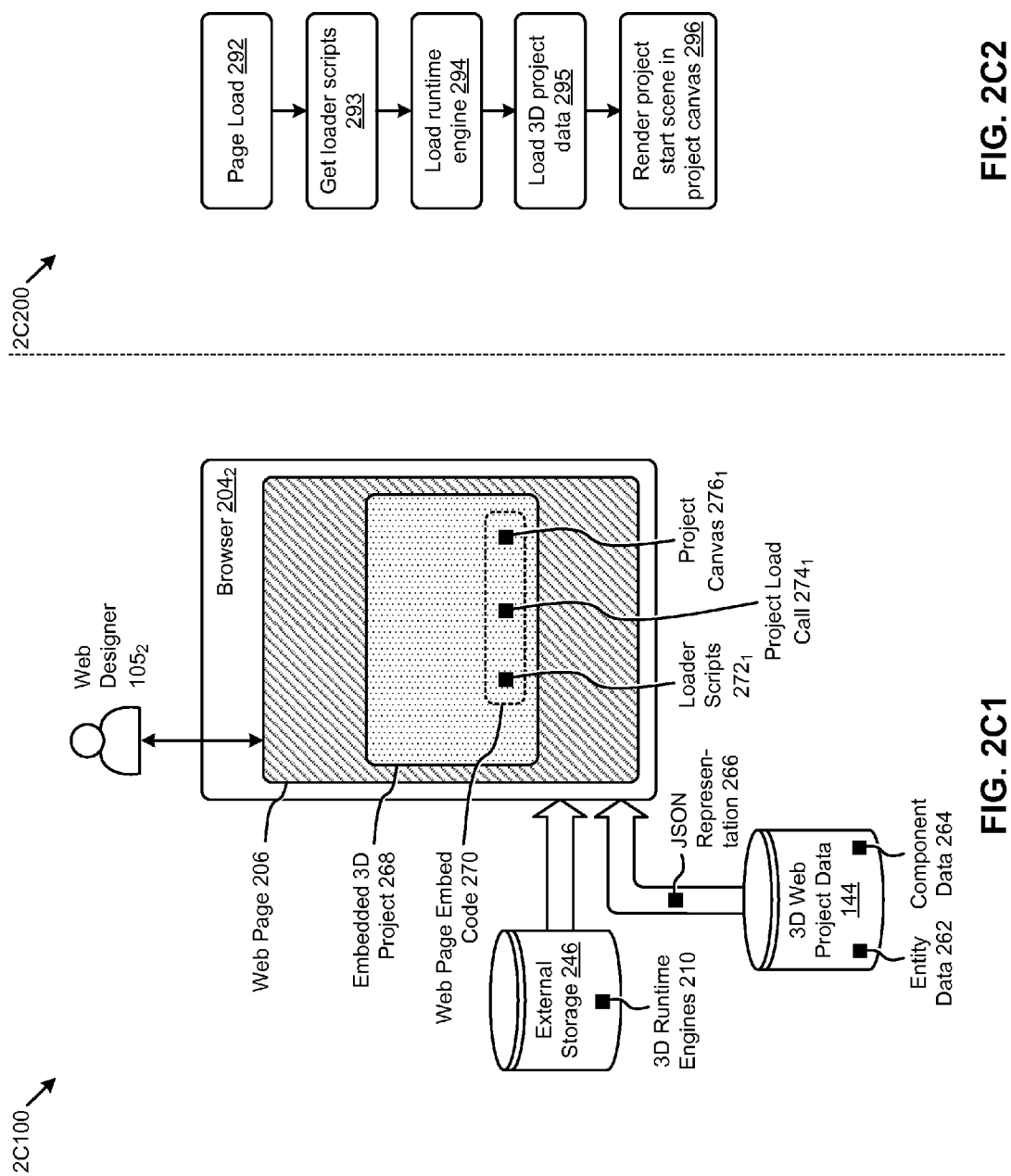

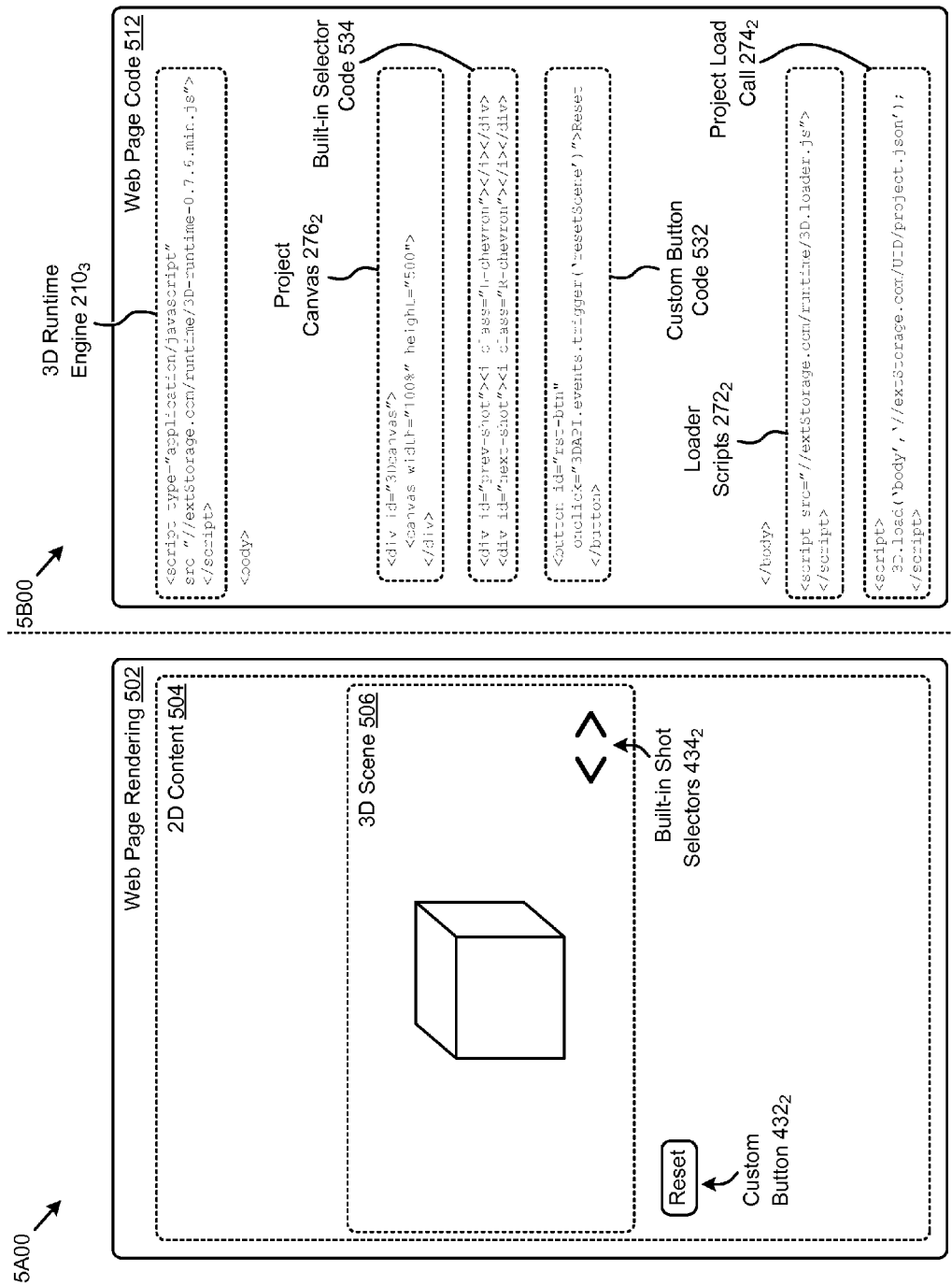

COMPOSING WEB-BASED INTERACTIVE 3D SCENES USING HIGH ORDER VISUAL EDITOR COMMANDS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

This disclosure relates to the field of cloud-based collaboration facilities, and more particularly to techniques for composing web-based interactive 3D scenes using high order visual editor commands.

BACKGROUND

Rendering 3D graphics on a screen has long been the province of 3D developers who have access to specialized graphics hardware (e.g., a game console, a graphics processing unit, etc.) and code-level access to such specialized graphics hardware. Design of scenes was often done by collaboration between a director and a 3D developer, where the director specifies the camera shots and motions or other events, and the 3D developer writes the code (e.g., drawing API) to carry out the specified camera shots and events when executed on the game hardware.

Due to improvements in computing platforms, 3D scenes can now be rendered on a many types of computing devices such as laptops, tablets, and smart phones. Further, due to advances in browser markup language technologies (e.g., HTML5, Javascript, WebGL, etc.), certain renderings that were formerly only possible on game consoles and/or using custom applications can now be rendered in the web browser of such devices using the native functionality of the browser. Such convergence of capability has created a desire for web designers to embed 3D scenes into their websites and web pages. Unfortunately, web designers typically do not have the 3D software expertise of 3D developers, resulting in a gap between web design environments and the 3D code design environments. Even with the advent of WebGL graphics drawing APIs, there still remains an abstraction gap between the programmer's use model and the web designer's use model.

Legacy approaches to enabling 3D content in web applications have failed, at least to the extent that the programming model gaps and skills gaps remain. Some approaches provide tools (e.g., rendering libraries) that add an abstraction layer on top of WebGL, yet fall short of bridging the remaining gap to the web design environment. Such approaches still require a specialized graphics programming skillset to efficiently create 3D content.

The problem to be solved is therefore rooted in technological limitations of the legacy approaches. Improved techniques, in particular improved application of technology, are needed to address the problem of enabling a web designer to specify camera shots and interaction events of a web-based 3D scene without demanding 3D graphics programming. More specifically, the technologies applied in the aforementioned legacy approaches fail to achieve sought-after capabilities of the herein disclosed techniques for composing web-based interactive 3D scenes using high order shot abstractions and high order event abstractions in a browser editor. What is needed is a technique or techniques to improve the application and efficacy of various technologies as compared with the application and efficacy of legacy approaches.

SUMMARY

The present disclosure provides systems, methods, and computer program products suited to address the aforementioned issues with legacy approaches. More specifically, the present disclosure provides a detailed description of techniques used in systems, methods, and in computer program products for composing web-based interactive 3D scenes using a high order shots and high order events browser-based editing capability. Certain embodiments are directed to technological solutions for providing a web-based interactive editor that a web designer can use to apply high order shot and high order event components to a 3D scene that can be embedded in a web application. The embodiments advance the relevant technical fields as well as advancing peripheral technical fields. The disclosed embodiments modify and improve over legacy approaches. In particular, the herein-disclosed techniques provide technical solutions that address the technical problems attendant to enabling a web designer to specify camera shots and interaction events of a web-based 3D scene without demanding 3D graphics programming. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of high-performance graphics rendering and high-performance computing as well as advances in the technical fields of distributed storage.

A cloud-based environment is configured to interface with storage devices that store 3D object models and a 3D rendering code base that is accessible by two or more user devices over a network using browsers or web agents. A web application is delivered to the user device, whereupon the browser or agent receives the 3D object model and the 3D rendering code into a web application that has user controls for defining at least one 3D scene that is rendered using user-defined camera shots and events associated with the 3D object model. User controls serve to invoke generation of executable shot components corresponding to one or more shots. User controls also serve to invoke generation of one or more event handler components that correspond to at least one event. A preview of the 3D scene is presented by rendering the shots and events in a web application or web agent.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

The drawings described below are for illustration purposes only. The drawings are not intended to limit the scope of the present disclosure.

FIG. 2C1 illustrates a block diagram of a technique for delivering web-based interactive 3D scenes using a high order shots and high order events browser editor, according to some embodiments.

FIG. 2C2 is a web page load technique for web pages having web-based interactive 3D scenes composed using a high order shots and high order events browser editor, according to some embodiments.

FIG. 5A illustrates a rendered interactive 3D scene generated according to the herein-disclosed techniques for composing web-based interactive 3D scenes using a high order shots and high order events browser editor, according to some embodiments.

FIG. 5B presents selected web page code fragments to be executed when rendering interactive 3D scenes generated using the herein-disclosed web-based interactive 3D shot and event editor, according to some embodiments.

DETAILED DESCRIPTION

Figure 1:
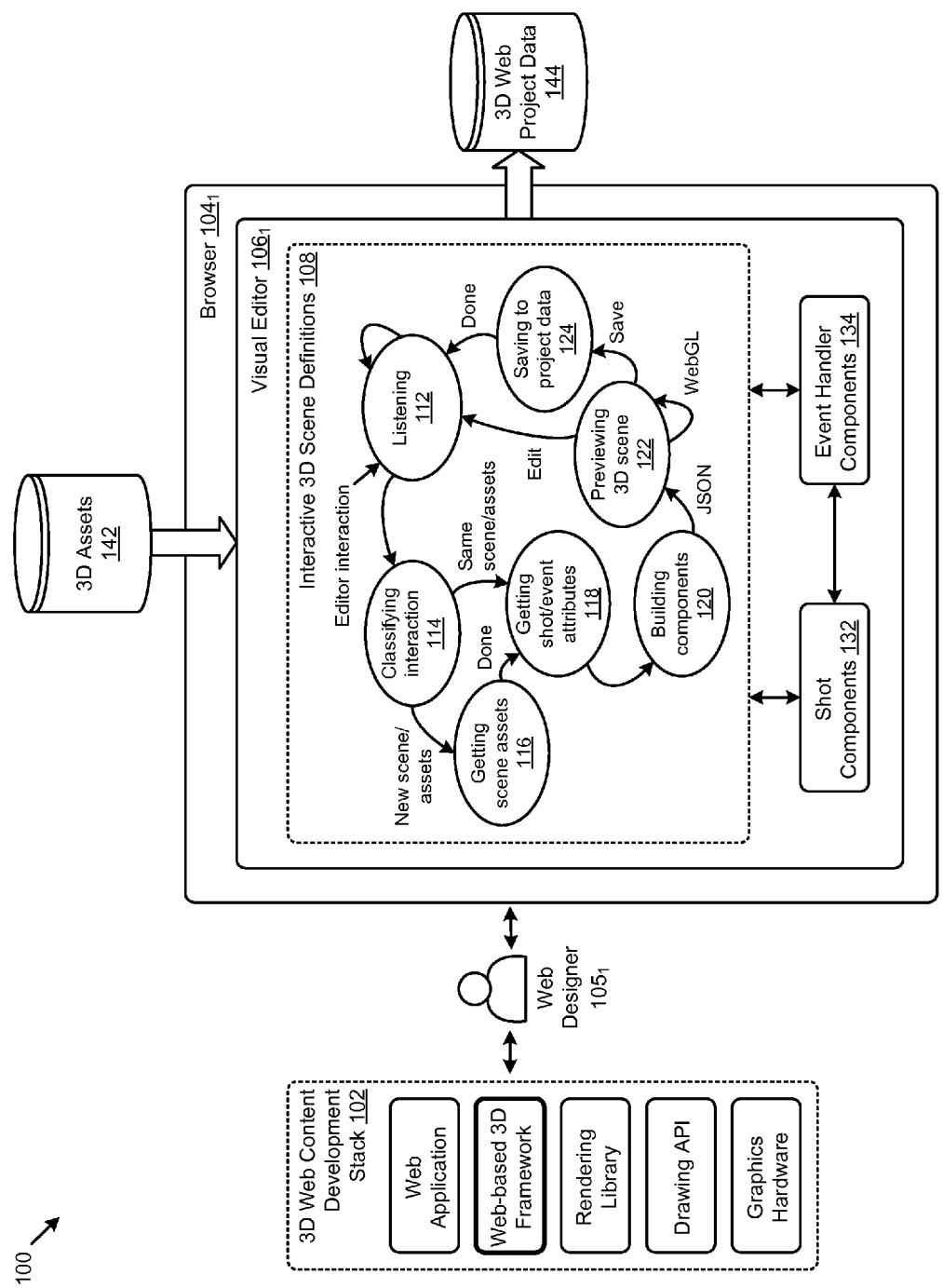
FIG. 1 presents a 3D scene browser interaction editing technique as used in systems for composing web-based interactive 3D scenes using a high order shots and high order events browser editor, according to an embodiment.

Some embodiments of the present disclosure address the problem of enabling a web designer to specify camera shots and interaction events of a web-based 3D scene without demanding 3D graphics programming and some embodiments are directed to approaches for providing a web-based interactive editor that a web designer can use to apply high order shot and high order event components to a 3D scene that can be embedded into a web application. More particularly, disclosed herein and in the accompanying figures are exemplary environments, systems, methods, and computer program products for composing web-based interactive 3D scenes using a high order shots and high order events browser editor.

Overview

A web designer is comfortable in web-oriented environments, and generally a web designer eschews hand coding in languages of any sort, but especially, web designers eschew hand coding in languages other than HTML or JavaScript. Yet, to support modern web application deployments, web designers are tasked with developing highly-interactive and highly-performant 3D imagery that can be deployed in, and interacted with through a browser interface. Prior to the availability of the techniques disclosed herein, such highly-interactive and highly-performant 3D imagery has demanded hand-coding in a computer language (e.g., assembly language or 'C'), and often has demanded a specialized platform (e.g., a game console or a game console development system).

The following figures describe how to make and use a web-based editor tool to specify camera shots and to specify interaction events in order to design browser-friendly renderings of web-based 3D scenes. The editor tool outputs browser-friendly rendering code in various forms (e.g., packaged HTML, JavaScript and URL-based resources) that are easily incorporated into web applications.

Various embodiments are described herein with reference to the figures. It should be noted that the figures are not necessarily drawn to scale and that the elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, reference throughout this specification to "some embodiments" or "other embodiments" refers to a particular feature, structure, material, or characteristic described in connection with the embodiments as being included in at least one embodiment. Thus, the appearances of the phrase "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1 presents a 3D scene browser interaction editing technique 100 as used in systems for composing web-based interactive 3D scenes using a high order shots and high order events browser editor. As an option, one or more variations of 3D scene browser interaction editing technique 100 or any aspect thereof may be implemented in the context of the architecture and functionality of the embodiments described herein. Also, the 3D scene browser interaction editing technique 100 or any aspect thereof may be implemented in any environment.

As shown in FIG. 1, a web designer $105_1$ might want to include 3D content in a web application, but does not have the skills to write the low order 3D graphics rendering code to be interpreted by a browser displaying the web application. Specifically, the web designer $105_1$ might be familiar with the "Web Application" abstraction layer of a 3D web content development stack 102, yet might not be familiar with the "Graphics Hardware" layer, the "Drawing API" layer (e.g., WebGL, etc.), and the "Rendering Library" layer (e.g., Three.js, Babylon.js, etc.). The 3D scene browser interaction editing technique 100 and the herein disclosed techniques can provide a "Web-based 3D Framework" layer to the web designer $105_1$, as shown, to bridge the gap between the web design environment and the 3D capabilities of the browser and device graphics hardware, without demanding that the web designer $105_1$ learn and/or write low order 3D drawing and/or rendering code.

More specifically, the 3D scene browser interaction editing technique 100 can be implemented in a web application (e.g., visual editor $106_1$) operating in a browser $104_1$ or operating in a web agent that is accessible to the web designer $105_1$ (e.g., from a user device). The visual editor $106_1$ can further access certain 3D assets 142, certain shot components 132, and certain event handler components 134, that can be used by the web designer $105_1$ to create certain interactive 3D scene definitions 108. For example, one or more instances of the interactive 3D scene definitions 108 might be stored as certain 3D web project data 144 that can be referenced by and/or embedded in a web application. In some cases, the web designer $105_1$ can use the visual editor $106_1$ to create the interactive 3D scene definitions 108, and also use the visual editor $106_1$ to create or augment web applications that might include the 3D scenes in combination with other content (e.g., 2D content such as text, pictures, buttons, links, etc.).

In one or more embodiments, the interactive 3D scene definitions 108 are created in the visual editor $106_1$ according to the shown state diagram. Specifically, the visual editor $106_1$ can be listening (see state 112), for an interaction invoked by an editor (e.g., web designer $105_1$). The web designer $105_1$ might use a mouse to rotate a 3D object and/or position a camera, select an item from a dropdown menu, enter a text description, and/or invoke other interactions. The visual editor $106_1$ can then classify the interaction (see state 114) and get scene assets (see state 116) and/or get shot and event attributes (see state 118). Setting up a new scene can be initiated by selecting a 3D object model from the 3D assets 142 for the scene. As a specific example, the web designer $105_1$ might specify one or more shots in a scene by specifying certain attributes (e.g., camera type, camera position, camera orientation, etc.) of respective instances of the shot components 132. Further, the web designer $105_1$ might specify one or more events in a scene by specifying certain attributes (e.g., event listener, event trigger, event action, etc.) of respective instances of the event handler components 134. The visual editor $106_1$ can then build the components for the scene (see state 120). Such components, for example, can be in a web-friendly object serialization format (e.g., JSON, XML, etc.). The visual editor $106_1$ can interpret the components specified for the 3D scene to render a preview of the 3D scene (see state 122). Based on the preview, the web designer $105_1$ might save the 3D scene (e.g., components, etc.) to the 3D web project data 144 (see state 124) and/or might continue editing. One embodiment of a system comprising the visual editor $106_1$ supporting the herein disclosed techniques is shown and discussed as pertains to FIG. 2A.

Figure 2A:
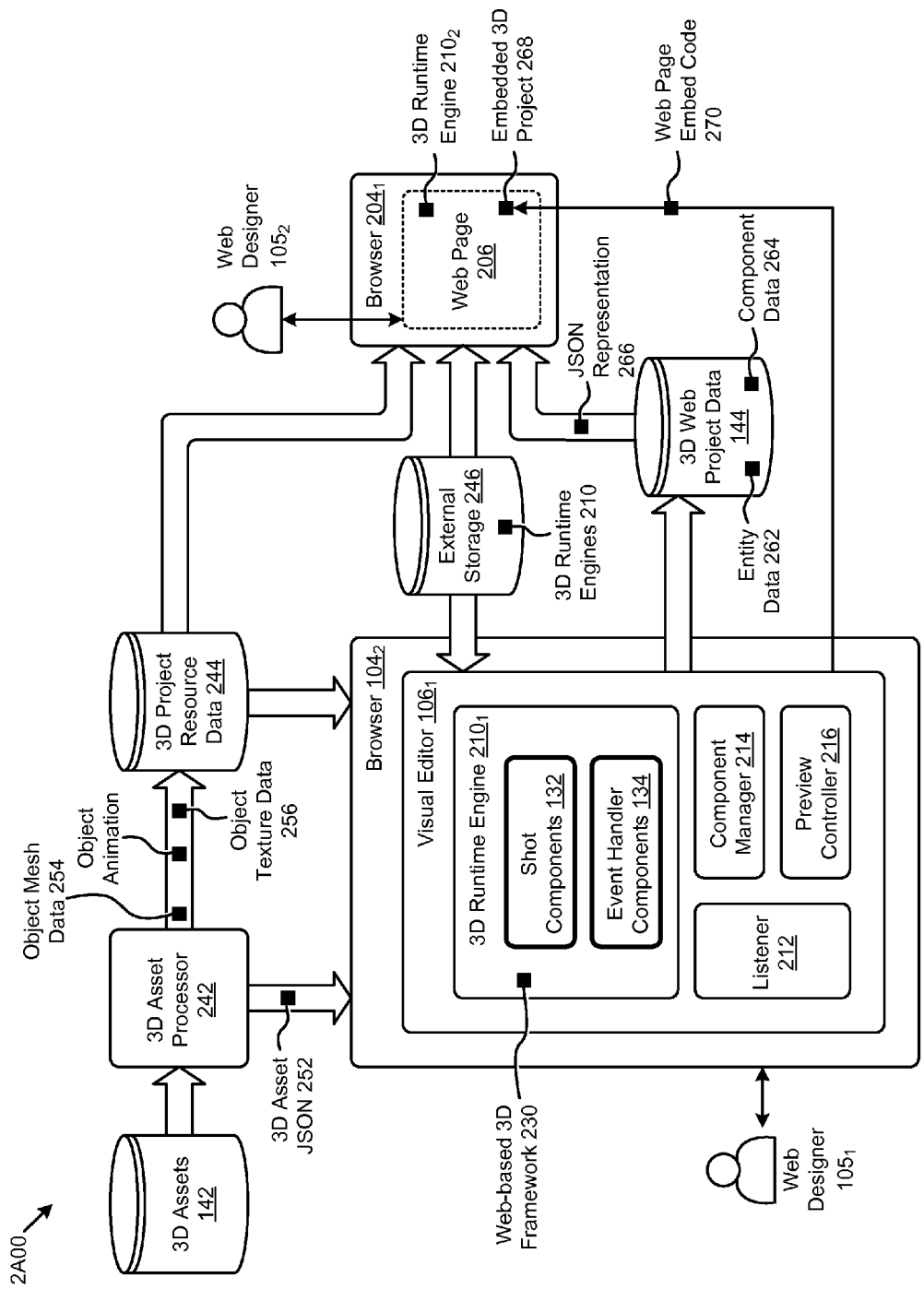
FIG. 2A illustrates a block diagram of a system for composing web-based interactive 3D scenes using a high order shots and high order events browser editor, according to some embodiments.

FIG. 2A illustrates a block diagram of a system 2A00 for composing web-based interactive 3D scenes using a high order shots and high order events browser editor. As an option, one or more variations of system 2A00 or any aspect thereof may be implemented in the context of the architecture and functionality of the embodiments described herein. Also, the system 2A00 or any aspect thereof may be implemented in any environment.

As shown in the embodiment of FIG. 2A, the visual editor $106_1$ of FIG. 1 can comprise a 3D runtime engine $210_1$, a listener 212, a component manager 214, and a preview controller 216. Other partitions are possible. The 3D runtime engine $210_1$ can comprise a web-based 3D framework 230 that can include the shot components 132 and the event handler components 134. Specifically, the listener 212 can listen for and respond to interactions from the web designer $105_1$ according to the aforementioned 3D scene browser interaction editing technique 100. The component manager 214 can be used to present and build components (e.g., shot components 132, event handler components 134, other components, etc.) that can be used to render 3D interactive scenes. For example, the preview controller 216 can render a preview of a 3D scene in the visual editor $106_1$ during an editing session. In some embodiments, the 3D runtime engine $210_1$ can be an instance of certain 3D runtime engines 210 (e.g., various versions of the engine) stored in an external storage 246.

In one or more embodiments, the 3D assets 142 can be processed by a 3D asset processor 242 to convert 3D assets (e.g., 3D models, textures, audio, video, etc.) to a web-friendly object serialization format (e.g., JSON, XML, etc.) for use by the visual editor $106_1$. Specifically, the output of the 3D asset processor 242 can be composed to enable loading by the 3D runtime engine $210_1$ for rendering in the browser $104_2$. For example, the 3D asset processor 242 can receive a 3D model, image, audio, video or zip file as input, and generate an array of JSON entities (e.g., 3D asset JSON 252) and resource files (e.g., object mesh data 254, object texture data 256, animation data, audio, video, etc.) that can be stored as 3D project resource data 244. In some cases, the 3D asset processor 242 can be a "node.js" application that converts various formats of 3D assets (see Table 1) to a format that the 3D runtime engine $210_1$ can interpret.

TABLE 1

Selection of supported file formats

| 3D Models | Images | Audio | Video |
|---|---|---|---|
| 3DS | BMP | AIF | AVI |
| DAE | DDS | MP3 | MKV |
| DXF | GIF | OGG | MOV |
| FBX | HDR | WAV | MP4 |
| OBJ | JPG | | MPG |
| PLY | PCX | | |
| STL | PNG | | |
| | SVG | | |
| | TGA | | |
| | TIF | | |

Further, in some embodiments, the 3D asset processor 242 can be implemented as a data processing pipeline. For example, for each input format, the 3D asset processor 242 can perform certain steps to produce the desired output. In such cases, the 3D asset processor 242 might implement certain external applications and scripts to process geometry, textures, audio, video, and other aspects of 3D assets. In one or more embodiments, multiple instances (e.g., a cluster) of the 3D asset processor 242 can be made available to process the 3D assets 142 stored in multiple storage devices. For example, a 3D asset might be uploaded to a cloud storage facility invoking the queuing of a new job to process the 3D asset. When the new job is at the front of the queue, an available 3D asset processor from the cluster can process the 3D asset and store the JSON entities and resource files in a database (e.g., MongoDB) for access by web designers using instances of the visual editor $106_1$.

As described in the foregoing, one or more instances of the interactive 3D scene definitions 108 specified by the web designer $105_1$ using the visual editor $106_1$ can be stored as certain 3D web project data 144 that can be referenced by and/or embedded in a web application such as a web page 206 operating in a browser or web agent $204_1$. For example, the web page 206 can be part of a web application developed by a web designer $105_2$. In some cases, one web designer can develop both the 3D project and the web application. As depicted, the 3D web project data 144 can comprise instances of entity data 262 and component data 264. The entity data 262 represents the building blocks of a 3D project and instances correspond to objects such as rendering library objects, textures, meshes, scenes, shots, cameras, events, etc. For example, in the "Three.js" rendering library, entity objects might include THREE.Texture, THREE.Object3D, etc. Entities can contains certain persisted settings, a loading state, and a reference to an underlying rendering library object. Entities are linked across multiple instances of the 3D runtime engines 210 such that when an entity is modified in one 3D runtime instance, the modified entity attributes are also accessible by other 3D runtime instances. Further, each entity in the entity data 262 can include certain components comprising the component data 264 that provide additional functionality to the core entity. For example, a component that provides a way to control an object with a mouse and/or keyboard might be added to a camera or any other object. Components can also provide a building block for the web designer $105_1$ to build functionality into the 3D runtime engine $210_1$. In some cases, components can comprise scripts, rendering library data, project attributes (e.g., hashed asset IDs, project IDs, etc.), and more.

Another output of the visual editor $106_1$ is certain web page embed code 270 that the web designer $105_2$ can embed in the web page code of the web page 206 to include an embedded 3D project 268 into the web page 206. As discussed further herein, the web page embed code 270 can, in part, access a JSON representation 266 of the 3D web project data 144 to render in the web page 206 the web-based interactive 3D scenes developed by the web designer $105_1$ in the visual editor $106_1$. The rendering of, and interaction with, the embedded 3D project 268 in the web page 206 is enabled, in part, by an instance of the 3D runtime engines 210 (e.g., 3D runtime engine $210_2$) running in the browser or web agent $204_1$. Further details describing such an instance of the 3D runtime engines 210 is shown and described as pertains to FIG. 2B.

Figure 2B:
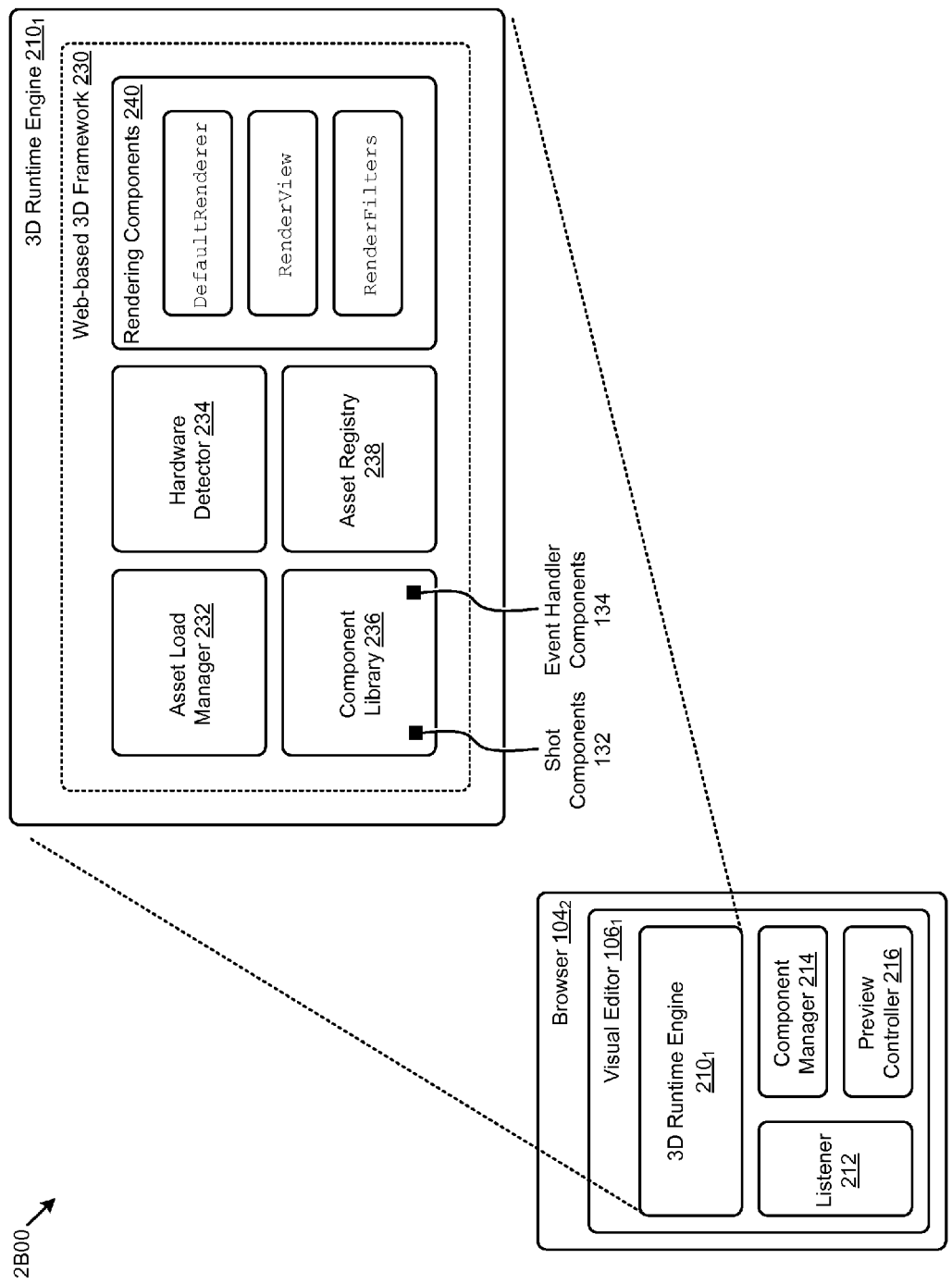
FIG. 2B illustrates a block diagram of a runtime engine for composing and delivering web-based interactive 3D scenes using a high order shots and high order events browser editor, according to some embodiments.

FIG. 2B illustrates a block diagram 2B00 of a runtime engine for composing and delivering web-based interactive 3D scenes using a high order shots and high order events browser editor. As an option, one or more variations of block diagram 2B00 or any aspect thereof may be implemented in the context of the architecture and functionality of the embodiments described herein. Also, the block diagram 2B00 or any aspect thereof may be implemented in any environment.

FIG. 2B illustrates one embodiment of the 3D runtime engine $210_1$ comprising the web-based 3D framework 230 that operates on certain backbone entities (e.g., 3D web project data 144) loaded at initialization of the 3D runtime engine $210_1$ (e.g., at page load). The 3D runtime engine $210_1$ handles the loading, rendering, and execution of web-based interactive 3D scenes composed using a high order shots and high order events browser editor. The 3D runtime engine $210_1$ operates the main update and render loops of the interactive 3D scene and processes web page events (e.g., button clicks, object picks, etc.) associated with the 3D scene. For example, the 3D runtime engine $210_1$ can process events that trigger object resize, focus, blur, etc. The 3D runtime engine $210_1$ also contains a reference to the current renderer (e.g., browser) and device (e.g., desktop computer, tablet, smart phone, etc.) capabilities.

As shown in the embodiment of FIG. 2B, the 3D runtime engine $210_1$ can include an asset load manager 232. The asset load manager 232 can help simplify loading of 3D assets for web designers. For example, many 3D assets comprise large volumes of data (e.g., for textures, models, animations, etc.). The asset load manager 232 can enable background loading of such data such that the web designer can monitor the loading progress while continuing other activities (e.g., editing in the visual editor $106_1$). The web designer can further use the asset load manager 232 to run logic based on the loading progress of every object and asset in the project.

Further the 3D runtime engine $210_1$ can include a hardware detector 234. Given the aforementioned wide range of hardware and computing platforms supporting web-based 3D rendering, the 3D runtime engine $210_1$ can use the hardware detector 234 to help ensure an embedded 3D project in a specific browser operating on a specific device performs as expected. Specifically, when the 3D runtime engine $210_1$ invokes the loading of the 3D project data for a given embedded 3D project, the hardware detector 234 can detect the capabilities of the current platform and load the appropriate version of the data. For example, certain texture sizes, compression formats, and/or shader features might be selected based on the current platform detected.

The 3D runtime engine $210_1$ can further comprise a component library 236, according to one or more embodiments. As shown, the component library 236 can comprise the shot components 132 and the event handler components 134. Each component in the component library can listen to predefined events (e.g., specified by the web designer $105_1$ in the visual editor $106_1$), such as frame updates, window resizing, viewer input, etc. The component library 236 can further include built in components (e.g., a rotate component, an explode component, a translate/rotate/scale component, an animate component, etc.) to provide common functionality without demanding that the web designer write any code.

When the 3D runtime engine $210_1$ is initialized with a reference to a 3D project, the 3D runtime engine $210_1$ can load the 3D project data (e.g., entity data, component data, etc.) associated with the 3D project into an asset registry 238. The asset registry 238 organizes and manages all entity data in the 3D runtime engine $210_1$ and provides methods for filtering and querying the entity data. The asset registry 238 can also contain certain sub-registries for different types of entities. For example, such sub-registries can provide logic and/or attributes associated with an entity type including default settings, etc.

Rendering a 3D scene in the 3D runtime engine $210_1$ can be invoked by calls from a camera in the 3D scene to the renderer (e.g., browser) that is currently registered (e.g., through the hardware detector 234) with the 3D runtime engine $210_1$. Certain rendering components 240 in the 3D runtime engine $210_1$ can be used in rendering operations. For example, a DefaultRenderer component can be included to handle the lifecycle of the default renderer of the web-based 3D framework 230 (e.g., THREE.WebGLRenderer). The DefaultRenderer can also manage a registry of device capabilities and a registry of the separate render passes that can compose a 3D scene. Further, pre-render and post-render functions can be registered with the DefaultRenderer for execution before and after, respectively, an individual view is rendered. Such functions can be used for rendering that might be needed for different views as compared to every frame. For example, a pre-render function can be used to render a planar reflection for a material, which can require a separate render of the scene for every view. In some embodiments, other renderers can also be used (e.g., deferred renderers, ray tracers, etc.).

The RenderView component can be used to render a view from the associated camera. For example, using attributes of the RenderView component, the web designer can set up a viewport (e.g., a rectangular area on the canvas in which to render) and a render priority (e.g., controlling what views render before others). In some cases, a call from the RenderView component to the DefaultRenderer component can include a RenderFilters component. The RenderFilters component can define certain post processing to be applied to a particular render. For example, a "bloom" filter might be applied to a renderer to cause bright colors to bleed out into surrounding pixels. In this case, applying the "bloom" filter can require several rendering passes, and the logic and intermediate buffers used to accomplish this effect are stored in each instance of the "bloom" RenderFilters component.

FIG. 2C1 illustrates a block diagram 2C100 of a technique for delivering web-based interactive 3D scenes using a high order shots and high order events browser editor. As an option, one or more variations of block diagram 2C100 or any aspect thereof may be implemented in the context of the architecture and functionality of the embodiments described herein. Also, the block diagram 2C100 or any aspect thereof may be implemented in any environment.

FIG. 2C1 shows the web agent or browser $204_2$ and web page 206 of FIG. 2A to illustrate a technique for delivering web-based interactive 3D scenes composed using a high order shots and high order events browser editor. The 3D web project data 144 and external storage 246 storing the 3D runtime engines 210 are also shown for reference. Specifically, the block diagram 2C100 illustrates that the web designer $105_2$ can develop the web page 206 with an embedded 3D project 268 by including the web page embed code 270 in the markup language code (e.g., HTML5 code) used to construct the web page 206. Specifically, according to some embodiments, the web page embed code 270 can comprise certain loader scripts $272_1$, a project load call $274_1$, and a project canvas $276_1$. According to one or more embodiments, such portions of the web page embed code 270 can be used to render the embedded 3D project 268 in the web page 206 as discussed in FIG. 2C2.

FIG. 2C2 is a web page load technique 2C200 for web pages having web-based interactive 3D scenes composed using a high order shots and high order events browser editor. As an option, one or more variations of web page load technique 2C200 or any aspect thereof may be implemented in the context of the architecture and functionality of the embodiments described herein. Also, the web page load technique 2C200 or any aspect thereof may be implemented in any environment.

The web page embed code 270 of FIG. 2C1 can enable the rendering of the embedded 3D project 268 in the web page 206 using the web page load technique 2C200, according to some embodiments. Specifically, when the web page 206 is loaded (see step 292), the page can reference all scripts associated with the page, such as the loader scripts $272_1$ (see step 293). In one or more embodiments, the loader scripts $272_1$ can include a project load function that can be called by the project load call $274_1$ to load an instance of the 3D runtime engine (see step 294) such as 3D runtime engine $210_2$. For example, an instance of the 3D runtime engine specific to the embedded 3D project 268 and/or having the latest engine updates can be loaded at each new page and/or project load. The project load call $274_1$ can further invoke the loading of the 3D project data (see step 295) associated with the embedded 3D project 268 (e.g., 3D web project data 144). For example, the latest version of the embedded 3D project 268 created by web designer $105_1$ in the visual editor $106_1$ can be stored in the 3D web project data 144 and loaded at each new page and/or project load. The loaded instance of the 3D runtime engine can then interpret the 3D project data to render the start scene (e.g., specified in the 3D project data) in the project canvas $276_1$ in the web page 206 (see step 296). In some embodiments, multiple instances of the 3D runtime engine can be loaded to manage (e.g., synchronize) multiple 3D canvases displaying different views of the same 3D project data. In other embodiments, the web page embed code, the 3D runtime engine, the 3D project data, and other code and data can be packaged for standalone implementation in a web application and/or other application.

Figure 3:
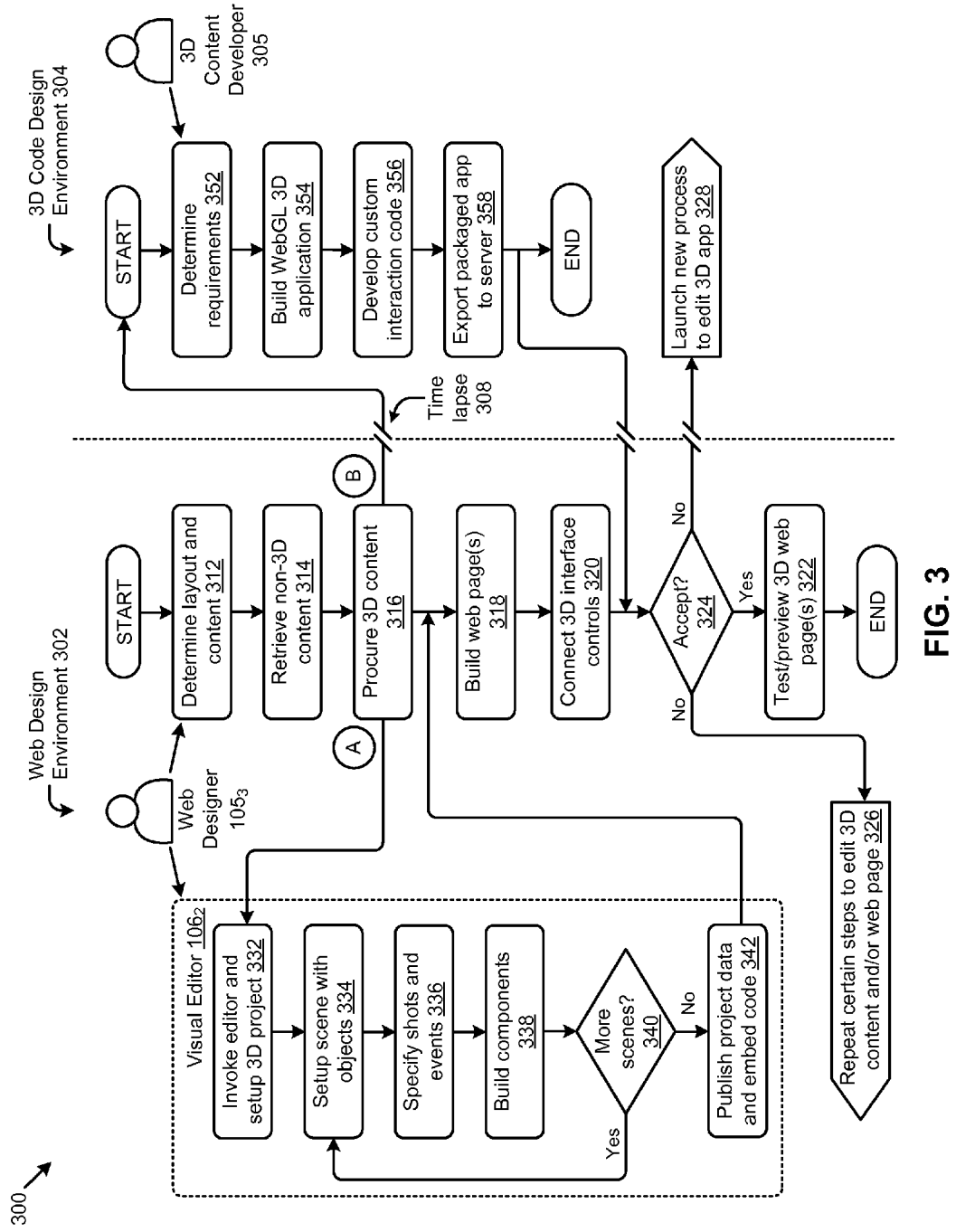
FIG. 3 depicts a flow for generating interactive 3D scenes as used in systems for composing web-based interactive 3D scenes using a high order shots and high order events browser editor, according to some embodiments.

The techniques shown and described as pertaining to FIG. 2C1 and FIG. 2C2 herein enable a web designer to integrate a web-based interactive 3D scene and/or project into a web application in a web design environment. FIG. 3 discusses a flow for applying such techniques, according to some embodiments, as compared to deploying legacy approaches to developing 3D web content.

FIG. 3 depicts a flow 300 for generating interactive 3D scenes as used in systems for composing web-based interactive 3D scenes using a high order shots and high order events browser editor. As an option, one or more variations of flow 300 or any aspect thereof may be implemented in the context of the architecture and functionality of the embodiments described herein. Also, the flow 300 or any aspect thereof may be implemented in any environment.

The flow 300 presents one embodiment of certain steps for generating interactive 3D scenes in a web design environment 302 using the herein disclosed techniques for composing web-based interactive 3D scenes using a high order shots and high order events browser editor (e.g., visual editor $106_2$). The flow 300 further shows, for comparison, certain steps for developing 3D web content in a 3D code design environment 304. As shown, a web designer $105_3$ can develop both the web application and the web-based interactive 3D scenes in the web design environment 302 according to the herein disclosed techniques. In comparison, legacy approaches require a 3D content developer 305 (e.g., a code developer) to develop the 3D web content in the 3D code design environment 304.

Specifically, the flow 300 can start with the web designer $105_3$ determining the layout and content of a subject web application (see step 312) such as a website and/or web page. Certain non-3D content (e.g., text, images, audio, etc.) can be retrieved by the web designer $105_3$ (see step 314). The web designer $105_3$ is familiar with techniques for discovering and embedded non-3D content into a given web application. The 3D content for the web application can then be downloaded, retrieved, produced or in any manner procured (see step 316) using the herein disclosed techniques for composing web-based interactive 3D scenes using a high order shots and high order events browser editor (see path A from step 316). Using such techniques, the web designer $105_3$ can invoke the visual editor $106_2$ in the web design environment 302 to setup the desired 3D project (see step 332). The scene and certain objects in the scene can be setup (see step 334), and certain shots and events can be specified to define the interactive 3D scene (see step 336). The resulting components associated with the scene can then be built according to the techniques described herein (see step 338). If more scenes are to be included in the project (see decision 340), the flow 300 returns to step 334. When all scenes have been specified, the 3D project data and embed code can be published (see step 342) for integration into the web application.

When the web pages associated with the web application have been built (see step 318) and the 3D embed code included, certain 3D interface controls in one or more web pages can be connected to the embedded 3D project (see step 320). Such connections can be enabled by web page calls to an API associated with the 3D runtime engine. For example, a button in the 2D portion of the web page might trigger an action in the 3D scene when clicked (e.g., onclick="3DAPI.events.trigger ('action')"). The resulting web application and 3D web pages can be tested and/or previewed by the web designer $105_3$ in the web design environment 302. If the web application is acceptable (see decision 324), the design of the web application with interactive 3D scenes is complete. If more editing is necessary, the web designer $105_3$ can efficiently iterate on the 3D content design and/or the web page design (see step 326) from one environment.

In legacy approaches, the 3D content for the site requires the 3D content developer 305 developing 3D content in the 3D code design environment 304 (see path B from step 316). Specifically, and as shown, procuring 3D content for a web application using legacy approaches can require a separate process from the web application development process. In some cases, the communication paths between such separate processes can comprise a time lapse 308. For example, the legacy approach requires that the web designer $105_3$ specify the details of the 3D content desired for the web application to the 3D content developer 305, yet the herein disclosed techniques enable the web designer $105_3$ to develop both the web application and the 3D content. When the 3D content developer 305 has determined the requirements for the 3D design (see step 352), the 3D content developer 305 can build the 3D application using a low order drawing API such as WebGL (see step 354). The 3D content developer 305 will further be required to write specialized custom code to enable any web page interactions external to the 3D application (see step 356). The 3D content developer 305 can then package the 3D application and export it to a server for upload by the web designer $105_3$ (see step 358). The web designer $105_3$ can include the 3D application in the web page in an <iframe> for testing (see step 322). However, the <iframe> approach is not preferred by web developers, at least inasmuch as that, for each design iteration, as the team members learn how the 3D application and the web application interact and also, for each design iteration as the team members learn how they should be rendered together, the web designer $105_3$ will need to frequently launch a new instance of the process shown in the 3D code design environment 304 in order to have the 3D developer edit the 3D code (see step 328). Vast improvements are possible using the flow of the web design environment 302 rather than any flows involving the 3D code design environment 304.

As discussed in the foregoing, one of the technology improvement benefits of the herein disclosed techniques is related to techniques for enabling the web designer $105_3$ to develop both the web application and the interactive 3D content to embed in the web application in a single web-oriented environment, such as the web design environment 302. Such a benefit is enabled, in part, by the high order shots and high order events browser editor (e.g., visual editor $106_2$). FIG. 4A through FIG. 4D describe various user interface views of the visual editor $106_1$.

Figure 4A:
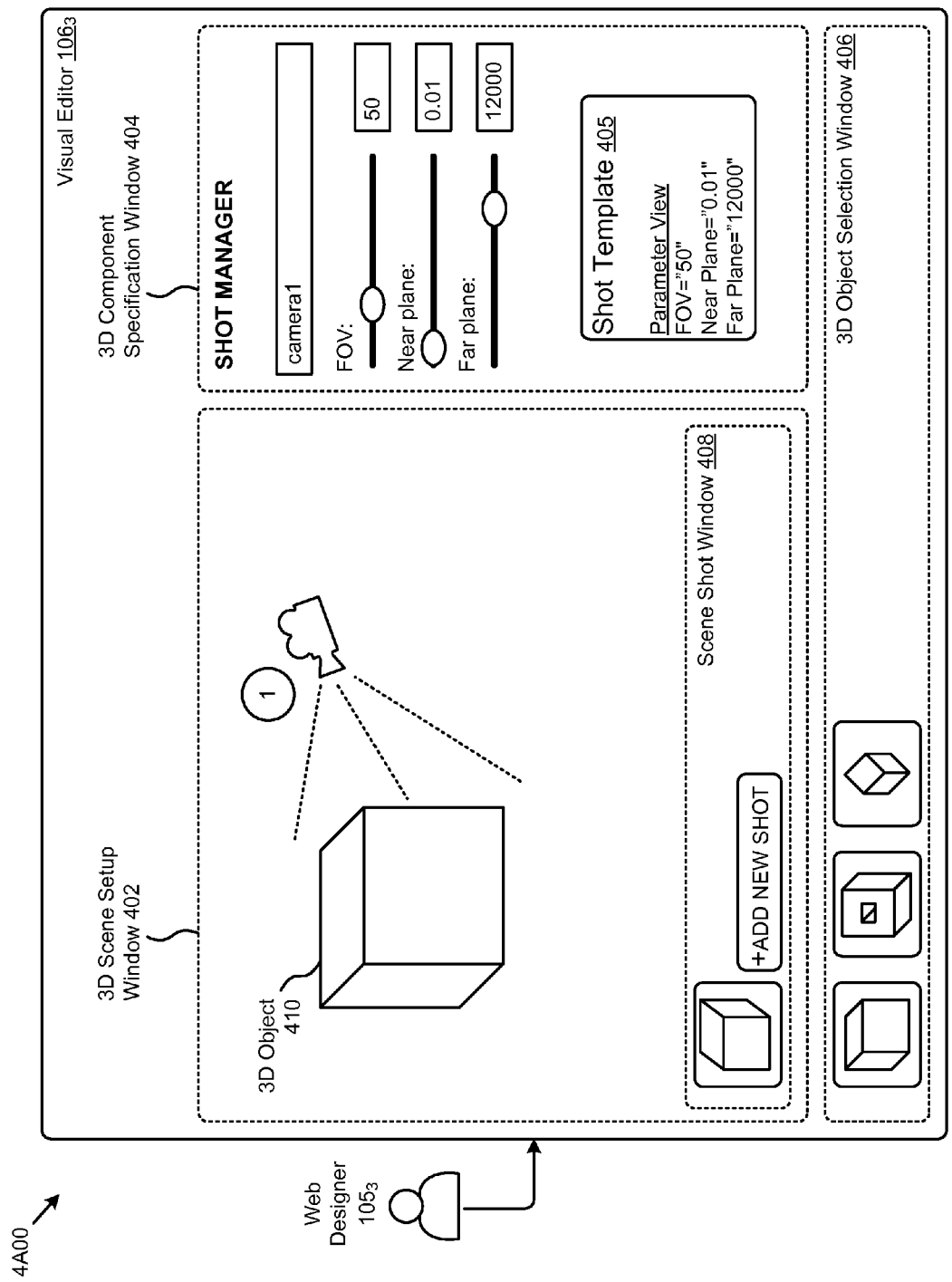
FIG. 4A exemplifies a user interface view showing a first camera shot being added to a 3D scene, according to an embodiment.

FIG. 4A exemplifies a user interface view 4A00 showing a first camera shot being added to a 3D scene. As an option, one or more variations of user interface view 4A00 or any aspect thereof may be implemented in the context of the architecture and functionality of the embodiments described herein. Also, the user interface view 4A00 or any aspect thereof may be implemented in any environment.

The user interface exemplified in the embodiment in FIG. 4A can be used by the web designer $105_3$ to establish various shots and events associated with web-based interactive 3D scenes. Specifically, the visual editor $106_3$ can comprise a 3D scene setup window 402, a 3D component specification window 404, a 3D object selection window 406, and a scene shot window 408 that can receive interactions from the web designer $105_3$ to define the shots and events. More specifically, the user interface view 4A00 exemplifies the web designer $105_3$ specifying a first camera shot for a 3D scene by dragging and dropping a 3D object 410 from the 3D object selection window 406 to the 3D scene setup window 402. The web designer $105_3$ can then select a camera (e.g., default camera "camera1") for the first shot from certain cameras provided by the visual editor $106_3$. Certain shot and/or camera attributes can then be specified. For example, the web designer $105_3$ can use a mouse to adjust the position and/or orientation of the shot (see position "1"), and/or use the sliders in the 3D component specification window 404 to adjust other camera attributes (e.g., FOV, near plane, far plane, etc.) and set parameters. The web designer $105_3$ might add further shots. Parameters are mapped into a shot template 405, as shown.

Strictly as one example, shots can be set up visually (e.g., using WYSIWYG in the visual editor). Setting up a shot is exemplified by specifying a camera with respective translation/rotation values. A shot can be triggered from code (e.g., as an event). The beginning and/or end of a shot can be tied to the event handler functions such that when a shot starts (e.g., at the beginning) some action is performed. Strictly as one example, Table 2 presents a shot triggering example.

TABLE 2

Shot triggering example

| Line | Code |
|---|---|
| 1 | VAPI.globalEvents.trigger('shotManager::play', 0); |
| 2 | // play the first shot, globally |
| 3 | shot.trigger('play'); // trigger based in reference to the shot |

Figure 4B:
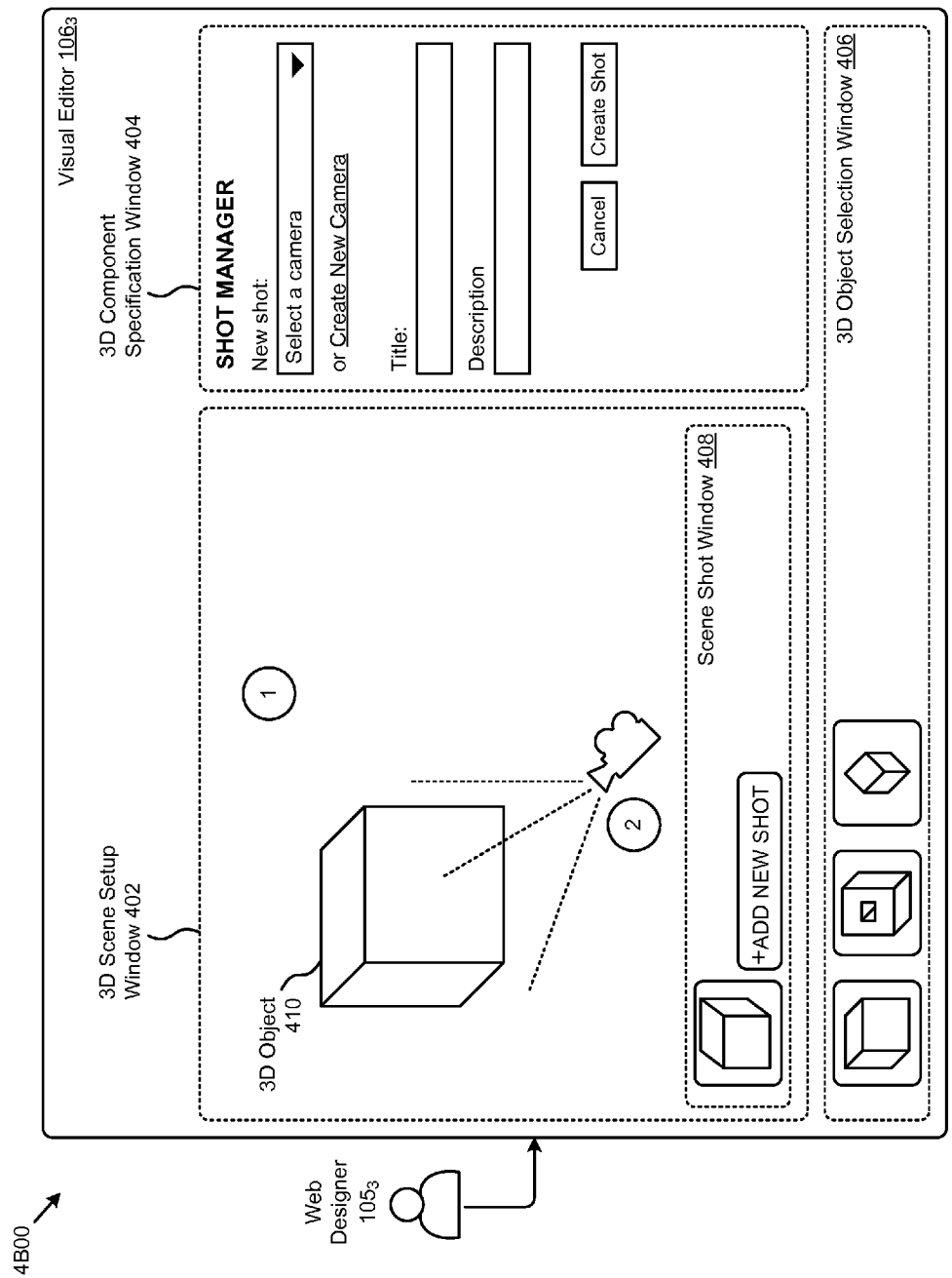
FIG. 4B exemplifies a user interface view showing a second camera shot being added to a 3D scene, according to an embodiment.

FIG. 4B exemplifies a user interface view 4B00 showing a second camera shot being added to a 3D scene. As an option, one or more variations of user interface view 4B00 or any aspect thereof may be implemented in the context of the architecture and functionality of the embodiments described herein. Also, the user interface view 4B00 or any aspect thereof may be implemented in any environment.

Specifically, the user interface view 4B00 exemplifies the web designer $105_3$ specifying a second camera shot for a 3D scene by clicking "+ADD NEW SHOT" in the scene shot window 408, and positioning and orientating the shot camera (see position "2") in the 3D scene setup window 402. An existing camera can be selected or a new camera created for the shot in the 3D component specification window 404. "Title" and "Description" can be optional. When "Create Shot" is clicked, the component data associated with the second shot can be updated with the specified attributes, and the user interface view shown in FIG. 4C can be presented for further interaction by the web designer $105_3$.

Figure 4C:
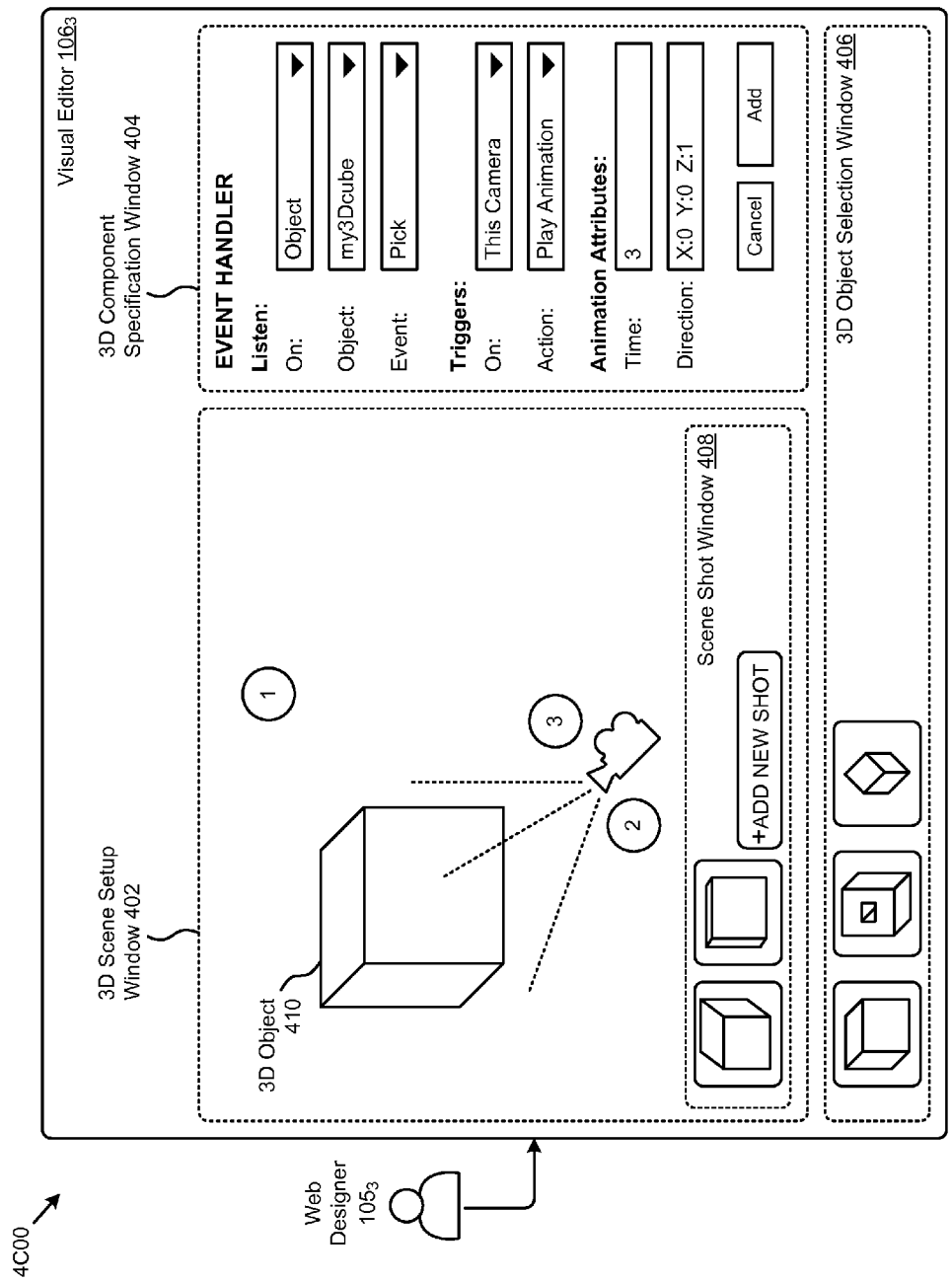
FIG. 4C exemplifies a user interface view showing a camera interaction event to be carried out in a 3D scene, according to an embodiment.

FIG. 4C exemplifies a user interface view 4C00 showing a camera interaction event to be carried out in a 3D scene. As an option, one or more variations of user interface view 4C00 or any aspect thereof may be implemented in the context of the architecture and functionality of the embodiments described herein. Also, the user interface view 4C00 or any aspect thereof may be implemented in any environment.

Specifically, the user interface view 4C00 exemplifies the web designer $105_3$ specifying a camera interaction event to be carried out in a 3D scene by selecting the camera associated with the second shot (see FIG. 4B) and adding a new event handler component. An event handler component provides the triggering of animations and actions (e.g., material color, camera movements, etc.), based on events in the scene. In this case, an animated translation of the second shot camera (e.g., zoom out) is desired. Specifically, various attributes of the new event handler component can be presented in the 3D component specification window 404 as shown. For example, the event handler component will listen for a "pick" on the object "my3Dcube" (e.g., 3D object 410), and respond by playing an animation on the selected camera (e.g., "This Camera"). Other listening targets might include asset, custom, keyboard, mouse, this camera, and portions of an object. Other object events might include begin hover, end hover, end timer, and various events related to animations. Certain animation attributes (e.g., time, direction, etc.) can further be specified using parameters. Clicking "Add" will update the event handler component and present the user interface view in FIG. 4D for further editing. Parameters are mapped into an event template.

Strictly as examples, input events can include input events originating from the 3D scene as well as input events originating from the web application or from outside the web application and passed into the web application. Strictly as examples, the embed code can listen to user events (e.g., scroll events, orientation changes, screen touches, etc.) that are signaled through the web application. Such events can originate from user interface devices that are present in a desktop setting, a laptop setting, a mobile setting, etc.

Figure 4D:
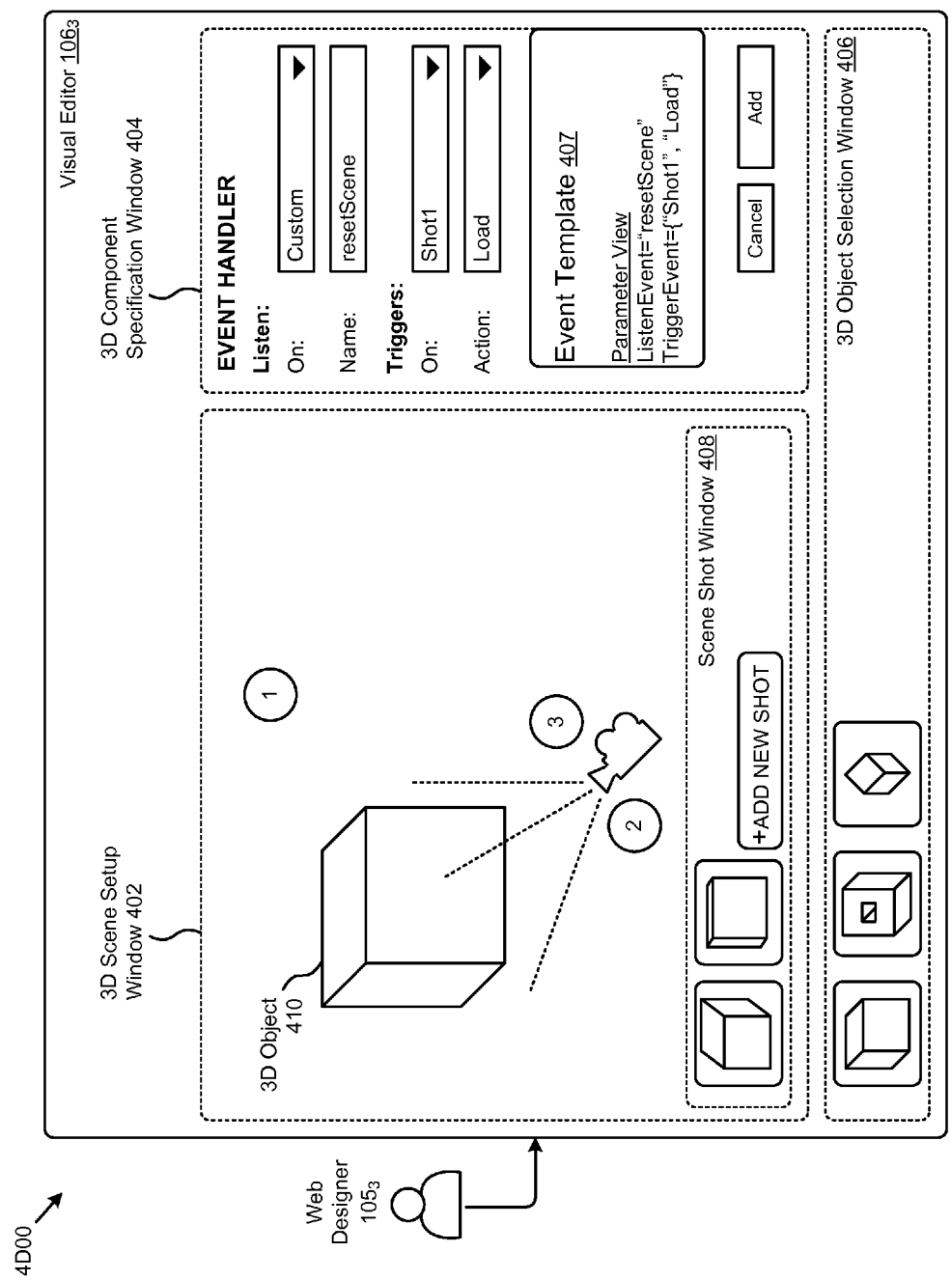
FIG. 4D exemplifies a user interface view showing an external interaction event to be carried out in a 3D scene, according to an embodiment.

FIG. 4D exemplifies a user interface view 4D00 showing an external interaction event to be carried out in a 3D scene. As an option, one or more variations of user interface view 4D00 or any aspect thereof may be implemented in the context of the architecture and functionality of the embodiments described herein. Also, the user interface view 4D00 or any aspect thereof may be implemented in any environment.

Figure 4E:
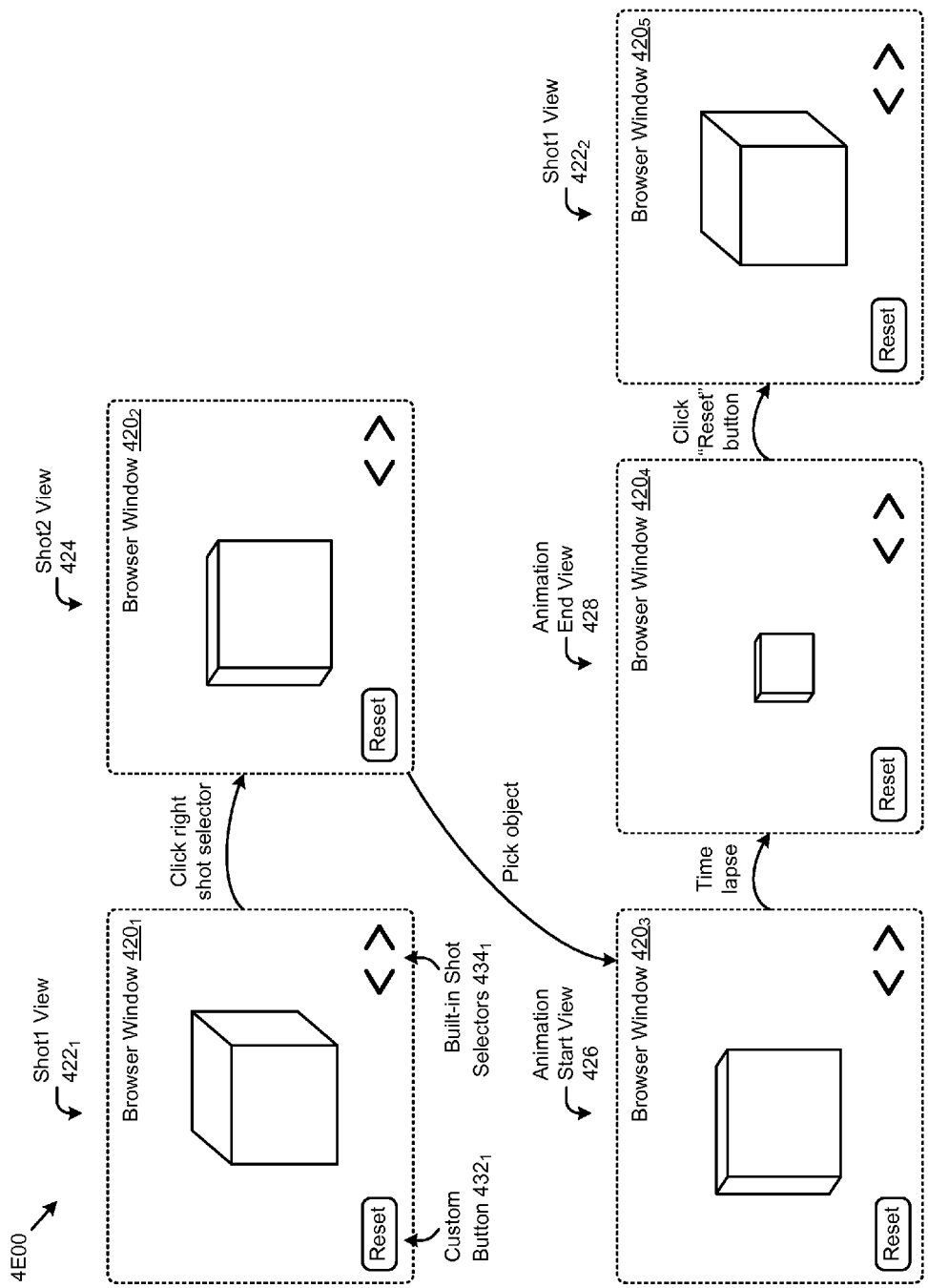
FIG. 4E shows web browser views of a 3D scene responsive to user interactions and composed using the herein-disclosed high order shots and high order events browser editor, according to an embodiment.

Specifically, the user interface view 4D00 exemplifies the web designer $105_3$ specifying an external interaction event to be carried out in a 3D scene by adding a new "custom" event handler component called "resetScene". This event handler component will listen for the argument "resetScene" to be received by the 3D runtime engine through the API, then will trigger the first shot "Shot1" to load into the scene. When the "Add" button is clicked, the shots and events specified in FIG. 4A through FIG. 4D can be previewed as illustrated in FIG. 4E. Further, parameters are mapped into an event template 407, as shown.

FIG. 4E shows web browser views 4E00 of a 3D scene responsive to user interactions and composed using the herein-disclosed high order shots and high order events browser editor. As an option, one or more variations of web browser views 4E00 or any aspect thereof may be implemented in the context of the architecture and functionality of the embodiments described herein. Also, the web browser views 4E00 or any aspect thereof may be implemented in any environment.

Specifically, the web browser views 4E00 depict the shots and events of an interactive 3D scene created by the web designer $105_3$ as shown and described as pertains to FIG. 4A through FIG. 4D. More specifically, upon invoking a preview of the interactive 3D scene, a shot1 view $422_1$ can be rendered in a browser window $420_1$. As shown, the interactive 3D scene can further comprise a custom button $432_1$ and certain built-in shot selectors $434_1$. For example, the custom button $432_1$ might be added by the web designer $105_3$ to trigger a custom event handler through the API of the 3D runtime engine. The built-in shot selectors $434_1$, in comparison, might be "built-in" such that they can interface with the 3D runtime directly. As shown, clicking the right shot selector of the built-in shot selectors $434_1$ can invoke the rendering of a shot2 view 424 in browser window $420_2$. When the object in the shot2 view 424 is picked, a camera translation is triggered (see FIG. 4C). The camera translation is depicted in FIG. 4E by a transition from an animation start view 426 in browser window $420_3$ to an animation end view 428 in browser window $420_4$. When the "Reset" button (e.g., custom button 432₁) is clicked, the scene is reset to the shot1 view 422₂ in browser window 420₅.

FIG. 5A illustrates a rendered interactive 3D scene 5A00 generated according to herein-disclosed techniques for composing web-based interactive 3D scenes using a high order shots and high order events browser editor. As an option, one or more variations of rendered interactive 3D scene 5A00 or any aspect thereof may be implemented in the context of the architecture and functionality of the embodiments described herein. Also, the rendered interactive 3D scene 5A00 or any aspect thereof may be implemented in any environment.

The embodiment shown in FIG. 5A depicts the foregoing interactive 3D scene example as a 3D scene 506 embedded within certain 2D content 504 and rendered in a web page rendering 502. The custom button 432₂ and built-in shot selectors 434₂ described earlier are also shown. Specifically, in this embodiment and example, the built-in shot selectors 434₂ can be included in the 3D scene 506 (e.g., the 3D canvas), and the custom button 432₂ can be external to the 3D scene 506 and among the 2D content 504. Such interaction between the 3D scene 506 and web page events (e.g., click of the custom button 432₂) external to the 3D scene 506 are enabled by the herein disclosed techniques for composing web-based interactive 3D scenes using a high order shots and high order events browser editor. Specifically, such techniques eliminate the need for a web designer to develop low order graphics drawing and/or rendering code and requires, instead, only web page code that is familiar to web designers.

FIG. 5B presents selected web page code fragments 5B00 to be executed when rendering interactive 3D scenes generated using the herein-disclosed web-based interactive 3D shot and event editor. As an option, one or more variations of selected web page code fragments 5B00 or any aspect thereof may be implemented in the context of the architecture and functionality of the embodiments described herein. Also, the selected web page code fragments 5B00 or any aspect thereof may be implemented in any environment.

FIG. 5B is merely one example of web page code 512 that can be included in a web page comprising an interactive 3D scene composed according to the herein disclosed techniques. Specifically, the web page code 512 can comprise certain loader scripts 272₂ (e.g., 3D.loader.js) that can be loaded from a server extStorage.com at page load. A project load call 274₂ (e.g., 3D.load) can further load project.json to the project canvas 276₂ (e.g., 3Dcanvas) in the body element of the page. The 3D runtime engine 210₃ (e.g., 3D-runtime-0.7.6.min.js) can also be included in the web page code 512 to render and enable interaction with the 3D scene. Specifically, the 3D runtime engine 210₃ can use the built-in selector code 534 and the custom button code 532 associated with the built-in shot selectors 434₂ and the custom button 432₂, respectively, to enable web page interaction with the 3D scene 506. As an example, when the "Reset" button (e.g., custom button 432₂) is clicked, the API call 3DAPI.events.trigger('resetScene') is sent to the 3D runtime engine 210₃ to invoke a certain response corresponding to the event handler component having a resetScene listener. In some cases, the web page may want to listen to an event from the 3D runtime engine 210₃ using an API command such as 3DAPI.globalEvents.on('MyCustomEvent',function ( ){/*action*/}).

Figure 6A:
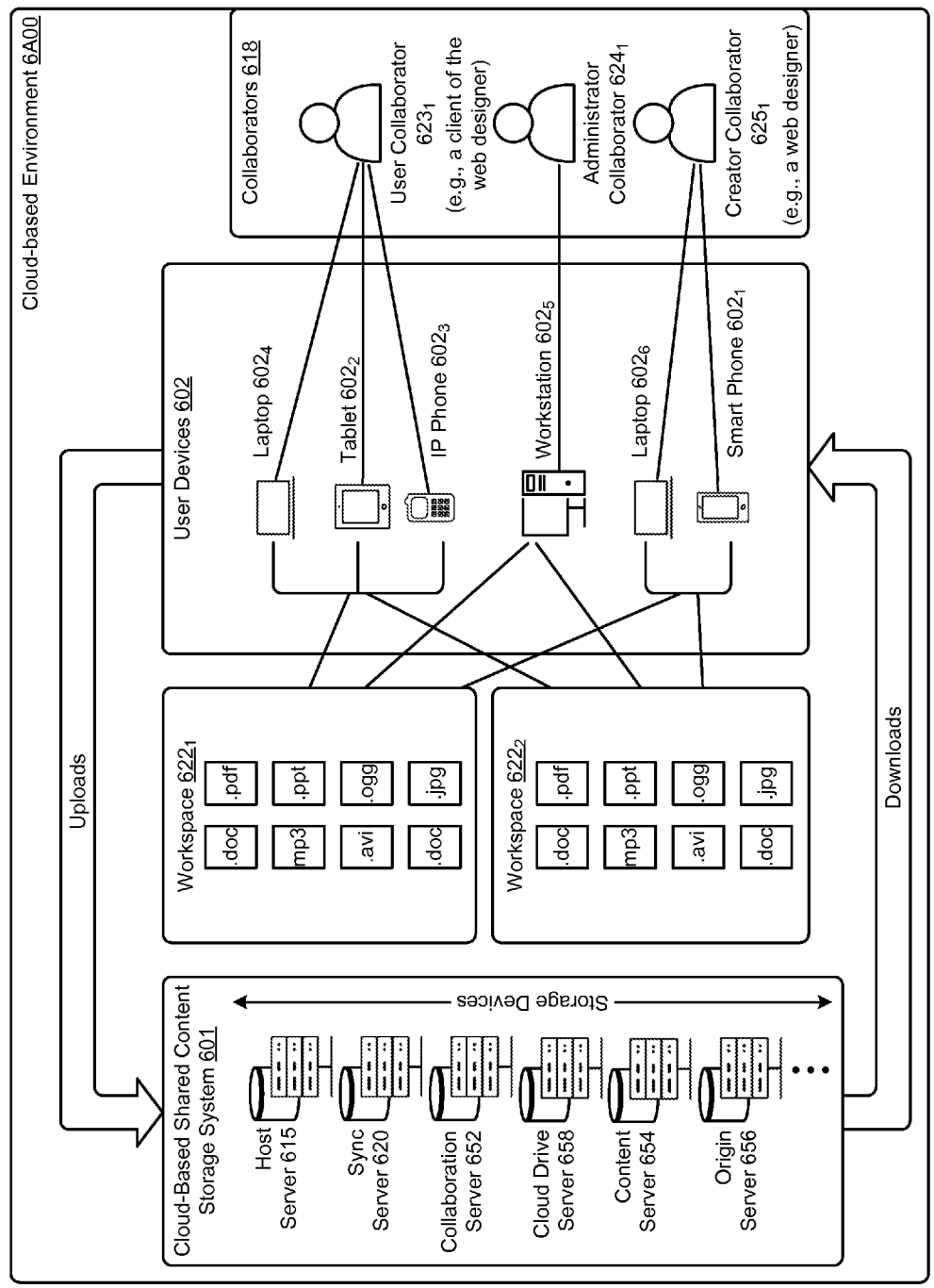
FIG. 6A presents a cloud-based environment having a cloud-based shared content management platform for composing web-based interactive 3D scenes using a high order shots and high order events browser editor, according to some embodiments.

FIG. 6A presents a cloud-based environment 6A00 having a cloud-based shared content management platform for composing web-based interactive 3D scenes using a high order shots and high order events browser editor. As an option, one or more variations of cloud-based environment 6A00 or any aspect thereof may be implemented in the context of the architecture and functionality of the embodiments described herein. Also, the cloud-based environment 6A00 or any aspect thereof may be implemented in any environment.

As shown, certain users (e.g., collaborators 618) having various collaboration roles (e.g., user collaborator 623₁, administrator collaborator 624₁, creator collaborator 625₁, etc.) can use one or more instances a variety of user devices 602 to interact with one or more workspaces (e.g., workspace 622₁, workspace 622₂, etc.) within the cloud-based environment 6A00. The workspaces can be stored in any location, and are at least partially maintained by components within a cloud-based shared content storage system 601. The cloud-based shared content storage system 601 supports any variety of processing elements and/or storage devices (e.g., a storage filer, a storage facility, etc.) and/or servers such as a host server 615, a sync server 620, a collaboration server 652, a cloud drive server 658, a content server 654, an origin server 656, etc. Some environments can include peripherals such as HMD displays (e.g., Oculus, GearVR, Cardboard, etc.), depth-sensing or environment-sensing input devices (e.g., Kinect, Leap motion, touch displays, Internet of things (IoT) devices, etc.). Moreover, any device with a Javascript interface can seamlessly plug in to various locations within this cloud-based shared content storage system. In one particular embodiment, the event handler supports interfacing such that an artist can design an application that responds to a Twitter feed. In other deployments the event handler supports interfacing to a temperature sensor (e.g., a "smart" thermostat in a home). The foregoing are merely interfacing examples, and other interfaces are possible.

Any of the users can access shared content from the cloud-based shared content storage system 601 without the additional process of manually downloading and storing the file locally on an instance of the user devices 602 (e.g., smart phone 602₁, tablet 602₂, IP phone 602₃, laptop 602₄, workstation 602₅, laptop 602₆, etc.). For example, certain electronically stored information (e.g., 3D content) created by the creator collaborator 625₁ (e.g., a web designer) might be viewed by the user collaborator 623₁ (e.g., the web designer's client) in a read-only mode. Such a facility streamlines the frequently repeated sharing and collaboration processes.

Functions and techniques performed by the cloud-based shared content storage system 601 and/or the client side components (e.g., user devices 602, a sync client on an instance of the user devices 602, etc.) are described herein with further details and with reference to several examples.

Figure 6B:
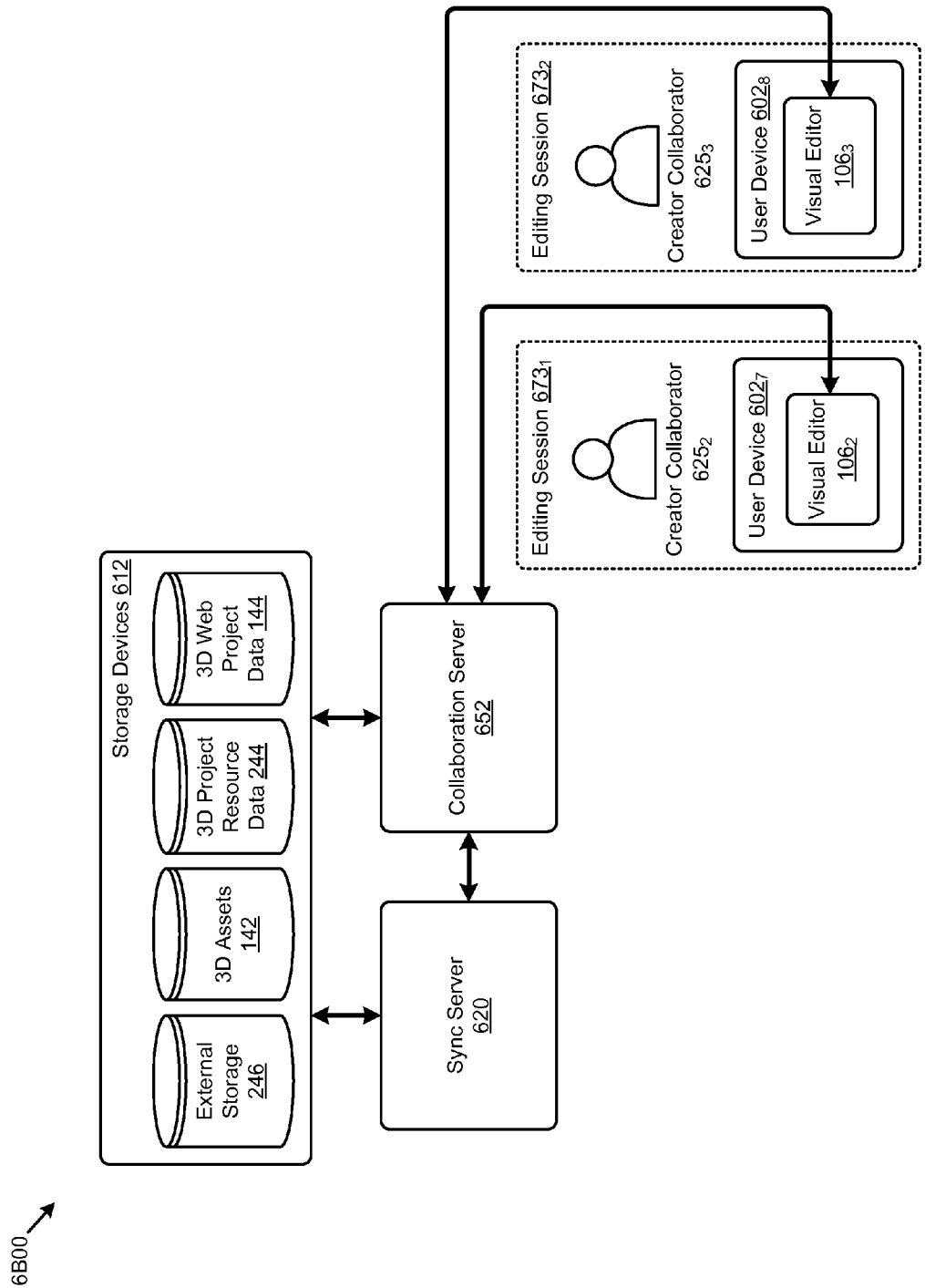
FIG. 6B is a schematic of a system data flow used to implement techniques for composing web-based interactive 3D scenes using a high order shots and high order events browser editor, according to some embodiments.

FIG. 6B is a schematic of a system data flow 6B00 used to implement techniques for composing web-based interactive 3D scenes using a high order shots and high order events browser editor. As an option, one or more variations of system data flow 6B00 or any aspect thereof may be implemented in the context of the architecture and functionality of the embodiments described herein. Also, the system data flow 6B00 or any aspect thereof may be implemented in any environment.

The shown system data flow 6B00 implements collaboration when securely sharing sensitive electronically stored information (e.g., files, images, project data, etc.). Collaborative information sharing can take place concurrently with other accesses in multiple concurrent sessions involving multiple concurrently sharing users. Specifically, composing web-based interactive 3D scenes using a high order shots and high order events browser editor and other operations can be supported by the collaboration server 652 and a sync server 620. Such servers can manage data associated with editing interactive 3D scenes (e.g., 3D assets, 3D runtime engines, 3D project data, etc.) and synchronize edits to such data at the shared information source.

Specifically, for example, a first web designer (e.g., a creator collaborator $625_2$) might want to collaborate with a second web designer (e.g., a creator collaborator $625_3$) on the development of a web application comprising an interactive 3D scene. The creator collaborator $625_2$ might employ a cloud-based shared content storage service that might use the collaboration server 652 to store the data related to the interactive 3D scene on certain storage devices 612 (e.g., external storage 246, 3D assets 142, 3D project resource data 244, and 3D web project data 144). The collaboration server 652 can further interface with the sync server 620 to assist in managing conflicts among various active versions of the interactive 3D scene. The creator collaborator $625_2$ and the user collaborator $623_2$ can interact with the cloud-based shared content storage service using instances of a visual editor (e.g., visual editor $106_2$ and visual editor $106_3$) operating on various instances of user devices 602 (e.g., user device $602_7$ and user device $602_8$) and can operate within respective editing sessions (e.g., editing session $673_1$, and editing session $673_2$). For example, a visual editor $106_1$ and a visual editor $106_2$ can be operated within respective editing sessions. Such visual editors can communicate with the collaboration server 652 to invoke and execute certain operations (e.g., content uploads, content downloads, content viewing, content tracking, etc.) provided by the cloud-based shared content storage service.

Many collaboration facilities are enabled by implementation of the foregoing. Strictly as examples of collaborative workflow facilitation, (1) a web designer can seamlessly move back and forth between working on the front end and working on the 3D models, which in turn reduces iteration cycles and fosters a high degree of fidelity between the views of the given 3D assets and the views provided in the resulting web applications (e.g., the colors match, the content scales precisely, the renderings are uniform between different devices, etc.); (2) review cycles are accelerated (e.g., communication between web designer and client can distill to simply sending a link to anyone on the team for feedback or help); (3) communication between time zone or geographically-distributed teams are now easier; (4) development and reuse cases are enabled, such as when content arrives dynamically and is automatically loaded into web applications. One example of the latter case involves a situation where an e-commerce site maintains thousands of products that are presented in a web application. The web designer can build the web application once, and as new products come in, their respective data items can get loaded to the cloud and pulled "on demand" into the web application.

Figure 7:
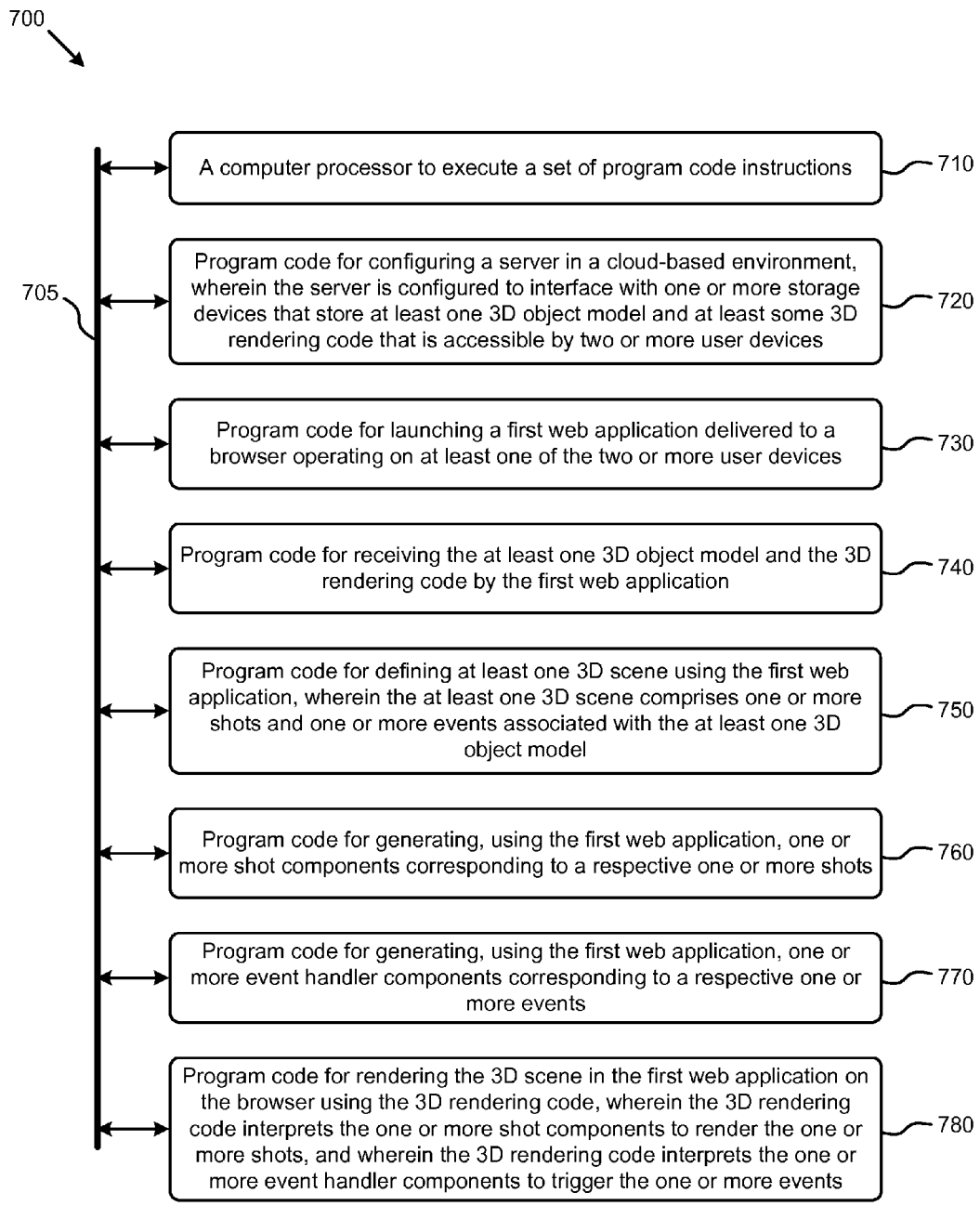
FIG. 7 depicts system components as arrangements of computing modules that are interconnected so as to implement certain of the herein-disclosed embodiments.

Additional Embodiments of the Disclosure
Additional Practical Application Examples FIG. 7 depicts a system 700 as an arrangement of computing modules that are interconnected so as to operate cooperatively to implement certain of the herein-disclosed embodiments. The partitioning of system 700 is merely illustrative and other partitions are possible. As an option, the present system 700 may be implemented in the context of the architecture and functionality of the embodiments described herein. Of course, however, the system 700 or any operation therein may be carried out in any desired environment. The system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims. The shown embodiment implements a portion of a computer system, presented as system 700, comprising a computer processor to execute a set of program code instructions (see module 710) and modules for accessing memory to hold program code instructions to perform: configuring a server in a cloud-based environment, wherein the server is configured to interface with one or more storage devices that store at least one 3D object model and at least some 3D rendering code that is accessible by two or more user devices (see module 720); launching a first web application delivered to a browser operating on at least one of the two or more user devices (see module 730); receiving the at least one 3D object model and the 3D rendering code by the first web application (see module 740); defining at least one 3D scene using the first web application, wherein the at least one 3D scene comprises one or more shots and one or more events associated with the at least one 3D object model (see module 750); generating, using the first web application, one or more shot components corresponding to a respective one or more shots (see module 760); generating, using the first web application, one or more event handler components corresponding to a respective one or more events (see module 770); rendering the 3D scene in the first web application on the browser using the 3D rendering code, wherein the 3D rendering code interprets the one or more shot components to render the one or more shots, and wherein the 3D rendering code interprets the one or more event handler components to trigger the one or more events (see module 780).

System Architecture Overview
Additional System Architecture Examples

Figure 8A:
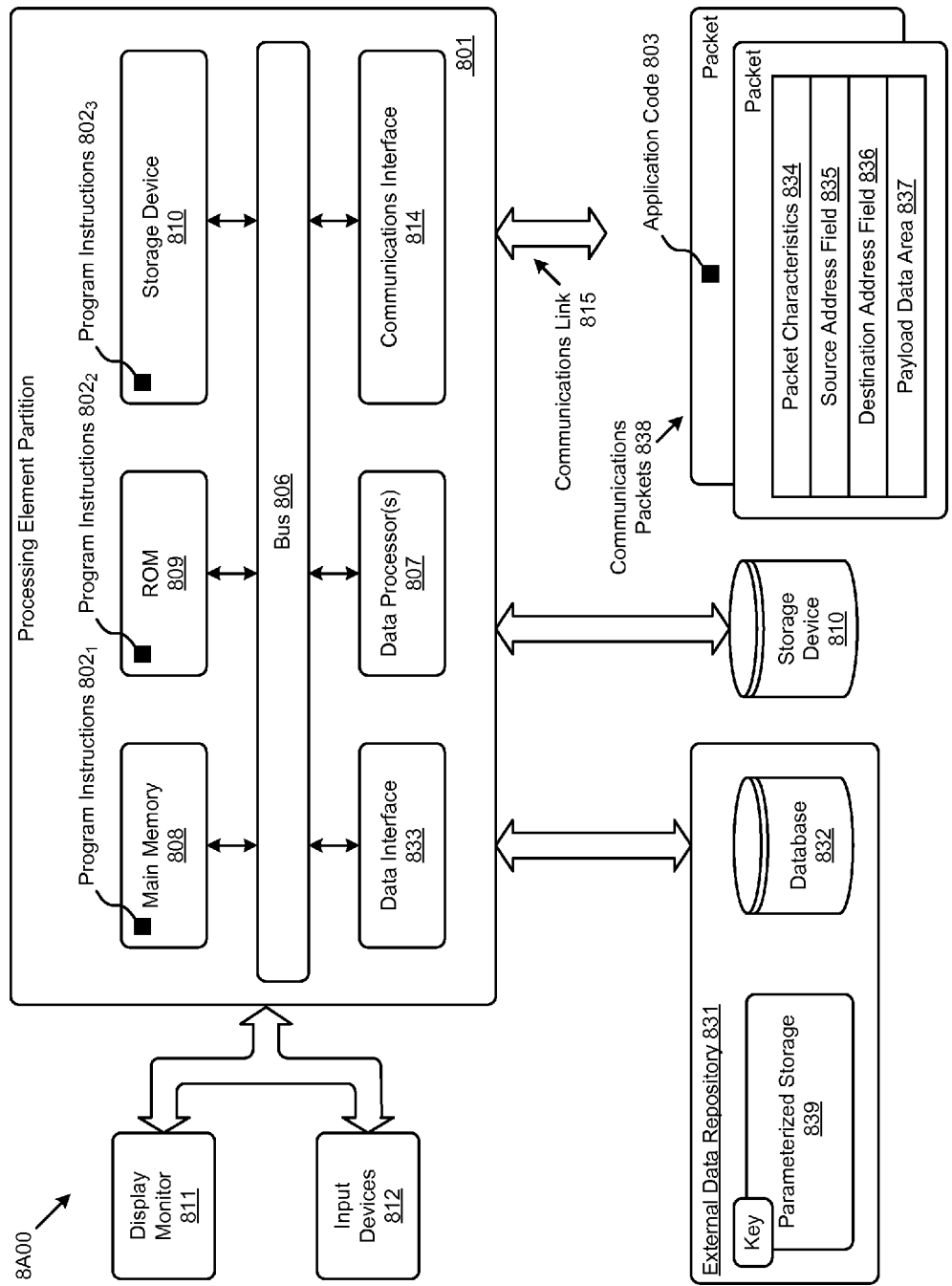
FIG. 8A and FIG. 8B depict exemplary architectures of components suitable for implementing embodiments of the present disclosure, and/or for use in the herein-described environments.

FIG. 8A depicts a block diagram of an instance of a computer system 8A00 suitable for implementing embodiments of the present disclosure. Computer system 8A00 includes a bus 806 or other communication mechanism for communicating information. The bus interconnects subsystems and devices such as a central processing unit (CPU), or a multi-core CPU (e.g., data processor 807), a system memory (e.g., main memory 808, or an area of random access memory (RAM)), a non-volatile storage device or non-volatile storage area (e.g., read-only memory 809), an internal or external storage device 810 (e.g., magnetic or optical), a data interface 833, a communications interface 814 (e.g., PHY, MAC, Ethernet interface, modem, etc.). The aforementioned components are shown within processing element partition 801, however other partitions are possible. The shown computer system 8A00 further comprises a display 811 (e.g., CRT or LCD), various input devices 812 (e.g., keyboard, cursor control), and an external data repository 831.

According to an embodiment of the disclosure, computer system 8A00 performs specific operations by data processor 807 executing one or more sequences of one or more program code instructions contained in a memory. Such instructions (e.g., program instructions $802_1$, program instructions $802_2$, program instructions $802_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination therefrom.

According to an embodiment of the disclosure, computer system 8A00 performs specific networking operations using one or more instances of communications interface 814. Instances of the communications interface 814 may comprise one or more networking ports that are configurable (e.g., pertaining to speed, protocol, physical layer characteristics, media access characteristics, etc.) and any particular instance of the communications interface 814 or port thereto can be configured differently from any other particular instance. Portions of a communication protocol can be carried out in whole or in part by any instance of the communications interface 814, and data (e.g., packets, data structures, bit fields, etc.) can be positioned in storage locations within communications interface 814, or within system memory, and such data can be accessed (e.g., using random access addressing, or using direct memory access DMA, etc.) by devices such as data processor 807.

The communications link 815 can be configured to transmit (e.g., send, receive, signal, etc.) any types of communications packets 838 comprising any organization of data items. The data items can comprise a payload data area 837, a destination address 836 (e.g., a destination IP address), a source address 835 (e.g., a source IP address), and can include various encodings or formatting of bit fields to populate the shown packet characteristics 834. In some cases the packet characteristics include a version identifier, a packet or payload length, a traffic class, a flow label, etc. In some cases the payload data area 837 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 807 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 831, which in turn can be formatted into any one or more storage areas, and which can comprise parameterized storage 839 accessible by a key (e.g., filename, table name, block address, offset address, etc.).

Execution of the sequences of instructions to practice certain embodiments of the disclosure are performed by a single instance of the computer system 8A00. According to certain embodiments of the disclosure, two or more instances of computer system 8A00 coupled by a communications link 815 (e.g., LAN, PTSN, or wireless network) may perform the sequence of instructions required to practice embodiments of the disclosure using two or more instances of components of computer system 8A00.

The computer system 8A00 may transmit and receive messages such as data and/or instructions organized into a data structure (e.g., communications packets 838). The data structure can include program instructions (e.g., application code 803), communicated through communications link 815 and communications interface 814. Received program code may be executed by data processor 807 as it is received and/or stored in the shown storage device or in or upon any other non-volatile storage for later execution. Computer system 8A00 may communicate through a data interface 833 to a database 832 on an external data repository 831. Data items in a database can be accessed using a primary key (e.g., a relational database primary key).

The processing element partition 801 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 807. Some embodiments include one or more special-purpose hardware components (e.g., power control, logic, sensors, transducers, etc.). A module may include one or more state machines and/or combinational logic used to implement or facilitate the performance characteristics of composing web-based interactive 3D scenes using a high order shots and high order events browser editor.

Various implementations of the database 832 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of composing web-based interactive 3D scenes using a high order shots and high order events browser editor). Such files or records can be brought into and/or stored in volatile or non-volatile memory.

Figure 8B:
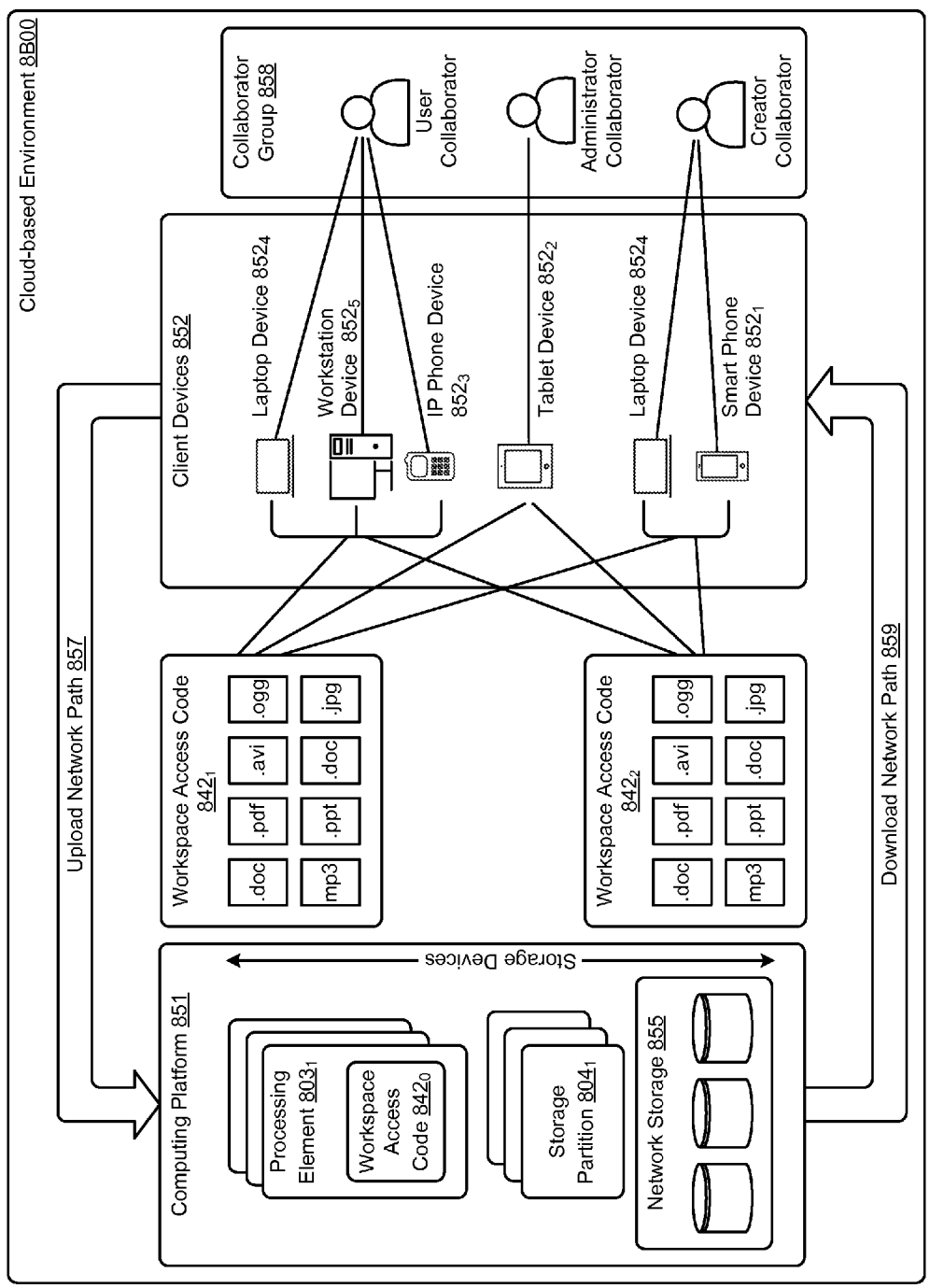

FIG. 8B depicts a block diagram of an instance of a cloud-based environment 8B00. Such a cloud-based environment supports access to workspaces through the execution of workspace access code (e.g., workspace access code $842_0$, workspace access code $842_1$ and workspace access code $842_2$). Workspace access code can be executed on any of the shown client devices 852 (e.g., laptop device $852_4$, workstation device 852₅, IP phone device 852₃, tablet device 852₂, smart phone device 852₁, etc.). A group of users can form a collaborator group 858, and a collaborator group can be composed of any types or roles of users. For example, and as shown, a collaborator group can comprise a user collaborator, an administrator collaborator, a creator collaborator, etc. Any user can use any one or more of the user devices, and such user devices can be operated concurrently to provide multiple concurrent sessions and/or other techniques to access workspaces through the workspace access code.

A portion of workspace access code can reside in and be executed on any user device. Also, a portion of the workspace access code can reside in and be executed on any computing platform 851, including in a middleware setting. As shown, a portion of the workspace access code resides in and can be executed on one or more processing elements (e.g., processing element 803₁). The workspace access code can interface with storage devices such the shown network storage 855. Storage of workspaces and/or any constituent files or objects, and/or any other code or scripts or data can be stored in any one or more storage partitions (e.g., storage partition 804₁). In some environments, a processing element includes forms of storage, such as RAM and/or ROM and/or FLASH, and/or other forms of volatile and non-volatile storage.

A stored workspace can be populated via an upload (e.g., an upload from client devices 852 to a processing element over an upload network path 857). A stored workspace can be delivered to a particular user and/or shared with other particular users via a download (e.g., a download from a processing element to a user device over a download network path 859).

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings to be regarded in an illustrative sense rather than in a restrictive sense.

What is claimed is:

1. A method comprising:
  configuring a server in a cloud-based environment, wherein the server is configured to interface with one or more storage devices that store at least one 3D object model and at least some 3D rendering code that is accessible by two or more user devices;
  initializing an editing session by launching a first web-based editor application that is delivered to a browser operating on at least one of the two or more user devices, the first web-based editor application operable to generate a sequence of 3D scenes for viewing on a second web-based application after the editing session is completed;
  receiving the at least one 3D object model and the 3D rendering code by the first web application;
  creating, during the editing session in the first web-based editor application, at least one 3D scene in the sequence of 3D scenes by:
    defining the at least one 3D scene, wherein the at least one 3D scene comprises one or more shots and one or more events associated with the at least one 3D object model;
    generating one or more shot components corresponding to a respective one or more shots;
    generating one or more event handler components corresponding to a respective one or more events; and
    rendering the at least one 3D scene in the first web application on the browser using the 3D rendering code, wherein the 3D rendering code interprets the one or more shot components to render the one or more shots, and wherein the 3D rendering code interprets the one or more event handler components to trigger the one or more events; and
  storing the sequence of 3D scenes after the editing session is completed in the first web application, the sequence of 3D scenes being rendered for viewing in the second web application.

2. The method of claim 1, further comprising generating project data, wherein the project data comprises at least a portion of, the at least one 3D object model, the one or more shot components, and the one or more event handler components.

3. The method of claim 2, further comprising determining embed code for embedding in a second web application to render the at least one 3D scene in the second web application, wherein the embed code is associated with the project data and the 3D rendering code.

4. The method of claim 1, further comprising receiving one or more user interface commands based on interactions invoked by the at least one of the two or more user devices, and wherein at least one of the one or more shots, or the one or more events, are based on the one or more user interface commands.

5. The method of claim 1, further comprising:
  receiving a user interaction to create a subsequent 3D scene if it is determined that additional scenes are to be added to the sequence of 3D scenes, wherein graphical representations corresponding to a plurality of scenes within the sequence of 3D scenes are concurrently displayed in the first web-based editor application;
  displaying graphical representations corresponding to a plurality of scenes within the sequence of 3D scenes such that the graphical representations are concurrently displayed in the first web-based editor application;
  publishing project data for integration into the first web application after the sequence of 3D scenes have been specified in the first web application;
  building a web page associated with the first web application after the project data has been published; and
  connecting the one or more shot components and the one or more event handler components to the project data.

6. The method of claim 1, further comprising processing the at least one 3D object model to form a serialized object representation of aspects of the at least one 3D object model to send to the first web application.

7. The method of claim 1, wherein at least one of, the one or more shot components, or the one or more event handler components, is a JSON representation.

8. The method of claim 1, wherein the 3D rendering code comprises at least one of, Three.js code, or Babylon.js code, or WebGL code, or OpenGL code, or Javascript code or any combination thereof.

9. The method of claim 1, wherein the at least one 3D object model comprises at least one mesh and at least one texture.

10. The method of claim 1, wherein the 3D rendering code comprises a 3D runtime engine, wherein the 3D runtime engine is uploaded to the first web application on page load.

11. A computer program product, embodied in a non-transitory computer readable medium, the non-transitory computer readable medium having stored thereon a sequence of instructions which, when stored in memory and executed by a processor causes the processor to perform a set of acts, the acts comprising:
  configuring a server in a cloud-based environment, wherein the server is configured to interface with one or more storage devices that store at least one 3D object model and at least some 3D rendering code that is accessible by two or more user devices;
  initializing an editing session by launching a first web-based editor application that is delivered to a browser operating on at least one of the two or more user devices, the first web-based editor application operable to generate a sequence of 3D scenes for viewing on a second web-based application after the editing session is completed;
  receiving the at least one 3D object model and the 3D rendering code by the first web application;
  creating, during the editing session in the first web-based editor application, at least one 3D scene in the sequence of 3D scenes by:
    defining the at least one 3D scene, wherein the at least one 3D scene comprises one or more shots and one or more events associated with the at least one 3D object model;
    generating one or more shot components corresponding to a respective one or more shots;
    generating one or more event handler components corresponding to a respective one or more events; and
    rendering the at least one 3D scene in the first web application on the browser using the 3D rendering code, wherein the 3D rendering code interprets the one or more shot components to render the one or more shots, and wherein the 3D rendering code interprets the one or more event handler components to trigger the one or more events; and
  storing the sequence of 3D scenes after the editing session is completed in the first web application, the sequence of 3D scenes being rendered for viewing in the second web application.

12. The computer program product of claim 11, further comprising instructions to perform the act of generating project data, wherein the project data comprises at least a portion of, the at least one 3D object model, the one or more shot components, and the one or more event handler components.

13. The computer program product of claim 12, further comprising instructions to perform the act of determining embed code for embedding in a second web application to render the at least one 3D scene in the second web application, wherein the embed code is associated with the project data and the 3D rendering code.

14. The computer program product of claim 11, further comprising instructions to perform the act of receiving one or more user interface commands based on interactions invoked by the at least one of the two or more user devices, and wherein at least one of the one or more shots, or the one or more events, are based on the one or more user interface commands.

15. The computer program product of claim 11, further comprising instructions to perform the act of processing the at least one 3D object model to form a serialized object representation of aspects of the at least one 3D object model to send to the first web application.

16. The computer program product of claim 11, wherein at least one of, the one or more shot components, or the one or more event handler components, is a JSON representation.

17. The computer program product of claim 11, wherein the 3D rendering code comprises at least one of, Three.js code, or Babylon.js code, or WebGL code, or OpenGL code, or Javascript code or any combination thereof.

18. The computer program product of claim 11, wherein the at least one 3D object model comprises at least one mesh and at least one texture.

19. A system comprising:
  one or more storage devices;
  one or more servers operating in a cloud-based environment, wherein at least one of the servers is configured to interface with the one or more storage devices that store at least one 3D object model and at least some 3D rendering code that is accessible by two or more user devices, and wherein the one or more servers performs acts of:
  initializing an editing session by launching a first web-based editor application that is delivered to a browser operating on at least one of the two or more user devices, the first web-based editor application operable to generate a sequence of 3D scenes for viewing on a second web-based application after the editing session is completed;
  receiving the at least one 3D object model and the 3D rendering code by the first web application;
  creating, during the editing session in the first web-based editor application, at least one 3D scene in the sequence of 3D scenes by:
    defining the at least one 3D scene, wherein the at least one 3D scene comprises one or more shots and one or more events associated with the at least one 3D object model;
    generating one or more shot components corresponding to a respective one or more shots;
    generating one or more event handler components corresponding to a respective one or more events; and
    rendering the at least one 3D scene in the first web application on the browser using the 3D rendering code, wherein the 3D rendering code interprets the one or more shot components to render the one or more shots, and wherein the 3D rendering code interprets the one or more event handler components to trigger the one or more events; and
  storing the sequence of 3D scenes after the editing session is completed in the first web application, the sequence of 3D scenes being rendered for viewing in the second web application.

20. The system of claim 19, further comprising a network path to transmit project data, wherein the project data comprises at least a portion of, the at least one 3D object model, the one or more shot components, and the one or more event handler components.

* * * * *